(12) United States Patent
Pietraski et al.

(10) Patent No.: US 10,499,347 B2
(45) Date of Patent: Dec. 3, 2019

(54) METHOD AND APPARATUS FOR ENHANCING CELL-EDGE USER PERFORMANCE AND SIGNALING RADIO LINK FAILURE CONDITIONS VIA DOWNLINK COOPERATIVE COMPONENT CARRIERS

(71) Applicant: InterDigital Patent Holdings, Inc., Wilmington, DE (US)

(72) Inventors: Philip J. Pietraski, Jericho, NY (US); Rui Yang, Greenlawn, NY (US); Kai Li, Edison, NJ (US); Carl Wang, Melville, NY (US); Tao Deng, Roslyn, NY (US); Samian Kaur, Plymouth Meeting, PA (US); Erdem Bala, East Meadow, NY (US); Ravikumar V. Pragada, Warrington, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 15/612,646

(22) Filed: Jun. 2, 2017

(65) Prior Publication Data
US 2017/0273036 A1    Sep. 21, 2017

Related U.S. Application Data

(63) Continuation of application No. 14/684,931, filed on Apr. 13, 2015, now Pat. No. 9,706,505, which is a
(Continued)

(51) Int. Cl.
*H04W 52/34* (2009.01)
*H04W 52/30* (2009.01)
(Continued)

(52) U.S. Cl.
CPC ........... *H04W 52/346* (2013.01); *H04L 5/001* (2013.01); *H04L 5/0035* (2013.01);
(Continued)

(58) Field of Classification Search
CPC ..... H04W 52/04; H04W 52/40; H04W 52/30; H04W 52/346; H04L 5/001; H04L 5/0035
See application file for complete search history.

(56) References Cited

U.S. PATENT DOCUMENTS

| 5,596,329 A | 1/1997 | Searle et al. |
| 8,274,927 B2 | 9/2012 | Kim et al. |

(Continued)

FOREIGN PATENT DOCUMENTS

| CN | 101404526 A | 4/2009 |
| JP | 2002-077042 | 3/2002 |

(Continued)

OTHER PUBLICATIONS

Alcatel-Lucent et al., "On selection of PUSCH for UCI transmission," 3GPP TSG-RAN WG1 #63bis, R1-110223, Dublin, Ireland (Jan. 17-21, 2011).
(Continued)

*Primary Examiner* — Kevin C. Harper
(74) *Attorney, Agent, or Firm* — Volpe and Koenig, P.C.

(57) ABSTRACT

A wireless transmit/receive unit (WTRU) receives first timing advances and first power control commands from a first eNodeB and second timing advances and second power control commands from a second eNodeB and transmits, to the first eNodeB, a first physical uplink control channel using a first uplink component carrier. The first physical uplink control channel has a first timing adjusted by the first timing advances but not by the second timing advances and a first power level adjusted by the first power control commands but not by the second power control commands.

(Continued)

The WTRU transmits a second physical uplink control channel using a second uplink component carrier. The second physical uplink control channel has a second timing adjusted by the second timing advances but not by the first timing advances and a second power level adjusted by the second power control commands but not by the first power control commands.

12 Claims, 16 Drawing Sheets

Related U.S. Application Data continuation of application No. 13/577,549, filed as application No. PCT/US2011/024736 on Feb. 14, 2011, now abandoned.

(60) Provisional application No. 61/304,371, filed on Feb. 12, 2010, provisional application No. 61/304,217, filed on Feb. 12, 2010, provisional application No. 61/303,967, filed on Feb. 12, 2010.

(51) Int. Cl.

| | |
|---|---|
| *H04L 5/00* | (2006.01) |
| *H04W 16/08* | (2009.01) |
| *H04W 52/40* | (2009.01) |
| *H04W 24/08* | (2009.01) |
| *H04W 52/32* | (2009.01) |
| *H04W 72/04* | (2009.01) |
| *H04W 52/36* | (2009.01) |
| *H04W 52/14* | (2009.01) |
| *H04W 52/28* | (2009.01) |
| *H04W 52/24* | (2009.01) |
| *H04W 36/00* | (2009.01) |

(52) U.S. Cl.
CPC .......... *H04L 5/0062* (2013.01); *H04L 5/0073* (2013.01); *H04W 16/08* (2013.01); *H04W 24/08* (2013.01); *H04W 52/30* (2013.01); *H04W 52/325* (2013.01); *H04W 52/34* (2013.01); *H04W 52/367* (2013.01); *H04W 52/40* (2013.01); *H04W 72/0413* (2013.01); *H04W 36/0069* (2018.08); *H04W 36/0083* (2013.01); *H04W 52/143* (2013.01); *H04W 52/242* (2013.01); *H04W 52/281* (2013.01); *H04W 52/283* (2013.01); *H04W 52/343* (2013.01); *Y02D 70/00* (2018.01)

(56) References Cited

U.S. PATENT DOCUMENTS

| | | | |
|---|---|---|---|
| 9,247,505 B2 | 1/2016 | Pajukoski et al. | |
| 2004/0085940 A1* | 5/2004 | Black | H04W 52/54 370/337 |
| 2004/0106412 A1 | 6/2004 | Laroia et al. | |
| 2005/0286472 A1* | 12/2005 | Lee | H04W 72/005 370/331 |
| 2006/0003787 A1* | 1/2006 | Heo | H04W 52/146 455/522 |
| 2006/0286996 A1* | 12/2006 | Julian | H04B 7/022 455/522 |
| 2007/0293260 A1* | 12/2007 | Xiao | H04W 52/146 455/522 |
| 2008/0273610 A1* | 11/2008 | Malladi | H04L 1/0029 375/260 |
| 2009/0270103 A1 | 10/2009 | Pani et al. | |
| 2010/0020852 A1 | 1/2010 | Erell et al. | |
| 2010/0027471 A1 | 2/2010 | Palanki et al. | |
| 2010/0034163 A1 | 2/2010 | Damnjanovic et al. | |
| 2010/0135237 A1 | 6/2010 | Papasakellariou et al. | |
| 2010/0222059 A1 | 9/2010 | Pani et al. | |
| 2010/0226327 A1* | 9/2010 | Zhang | H04B 7/0632 370/329 |
| 2010/0246463 A1 | 9/2010 | Papasakellariou et al. | |
| 2010/0291931 A1* | 11/2010 | Suemitsu | H04W 36/245 455/436 |
| 2010/0302964 A1 | 12/2010 | Guo | |
| 2010/0303039 A1 | 12/2010 | Zhang et al. | |
| 2011/0013581 A1 | 1/2011 | Lee et al. | |
| 2011/0021154 A1 | 1/2011 | Marinier et al. | |
| 2011/0038271 A1 | 2/2011 | Shin et al. | |
| 2011/0051654 A1 | 3/2011 | Blankenship et al. | |
| 2011/0092219 A1 | 4/2011 | Damnjanovic et al. | |
| 2011/0103332 A1 | 5/2011 | Kuo | |
| 2011/0105048 A1 | 5/2011 | Nakao et al. | |
| 2011/0207452 A1 | 8/2011 | Grob-Lipski et al. | |
| 2012/0134275 A1 | 5/2012 | Choi et al. | |
| 2012/0202501 A1 | 8/2012 | Morioka et al. | |
| 2013/0010964 A1 | 1/2013 | Fong et al. | |
| 2013/0163527 A1 | 6/2013 | Lunttila et al. | |
| 2013/0176988 A1 | 7/2013 | Wang et al. | |
| 2013/0215849 A1 | 8/2013 | Heo et al. | |
| 2017/0244534 A1* | 8/2017 | Heo | H04W 72/0413 |

FOREIGN PATENT DOCUMENTS

| | | | | |
|---|---|---|---|---|
| JP | WO 2009057544 A1 * | 5/2009 | .......... | H04W 36/245 |
| WO | WO09120125 A1 | 10/2009 | | |
| WO | 10/010516 | 1/2010 | | |
| WO | 10/016698 | 2/2010 | | |

OTHER PUBLICATIONS

Ericsson, "Control plane aspects of carrier aggregation," 3GPP TSG-RAN WG2 #66, R2-092958, San Francisco, USA (May 4-8, 2009).
Etri, "Explicit carrier activation/deactivation," 3GPP TSG RAN WG2 #68bis, R2-100148, Valencia, Spain (Jan. 18-22, 2010).
Huawei, "Carrier aggregation in active mode," 3GPP TSG-RAN WG2 Meeting #66, R2-093104, San Francisco, USA (May 4-8, 2009).
Interdigital, "RLF Procedures for Carrier Aggregation," 3GPP TSG-RAN WG2 Meeting #67, R2-094218, Shen Zhen, China (Aug. 24-28, 2009).
Itri, "Radio Link Failure in Carrier Aggregation," 3GPP TSG RAN WG2 #67bis, R2-096033, Miyazaki, Japan (Oct. 12-16, 2009).
LG Electronics, Inc., "Radio Link Failure considering carrier aggregation," 3GPP TSG-RAN2 Meeting #66bis, R2-093856, Los Angeles, California (Jun. 29-Jul. 3, 2009).
Nortel, "Power Allocation among eNBs in Closed-Loop DL CoMP Tranmission," 3GPP TSG-RAN Working Group 1 Meeting #56bis, R1-091378, Seoul, Korea (Mar. 23-27, 2009).
Panasonic, "Component carrier operation without PDCCH ," 3GPP TSG-RAN WG1 Meeting #58, R1-093598, Shenzhen, China (Aug. 24-28, 2009).
Panasonic, "PCFICH in cross carrier operation," 3GPP TSG-RAN WG1 #59bis, R1-100360, Valencia, Spain (Jan. 18-22, 2010).
Qualcomm Europe, "Carrier Aggregation in Heterogeneous Networks," 3GPP TSG RAN WG1 #55bis, R1-090357, Ljubljana, Slovenia (Jan. 12-16, 2009).
Qualcomm Europe, "CoMP email summary," 3GPP TSG-RAN WG1 #57bis, R1-092946, Los Angeles, USA (Jun. 29-Jul. 2, 2009).
Qualcomm Europe, "Notion of Anchor Carrier in LTE-A," 3GPP TSG RAN WG1 #56bis, R1-091458, Seoul, Korea (Mar. 23-27, 2009).
Qualcomm Europe, "Radio Link Monitoring in a Multicarrier Setting," 3GPP TSG-RAN WG2 #66bis, R2-093872, Los Angeles, California (Jun. 29-Jul. 3, 2009).
Qualcomm Europe, "Radio link monitoring in a multicarrier setting," 3GPP TSG-RAN WG2 #66bis, R2-093872, Los Angeles, CA, USA (Jun. 29-Jul. 3, 2009).

(56) References Cited

OTHER PUBLICATIONS

Qualcomm Incorporated, "Measurement considerations for carrier aggregation," 3GPP TSG-RAN WG2 meeting#68bis, R2-100421, Valencia, Spain (Jan. 18-22, 2010).
Qualcomm Incorporated, "UL Power Control for Multicarrier Operation," 3GPP TSG RAN WG1 #59bis, R1-100677, Valencia, Spain (Jan. 18-22, 2010).
RAN2, "LS on RAN2 status on carrier aggregation design," 3GPP TSG RAN WG1 Meeting #57bis, R1-092294, Los Angeles, CA, USA (Jun. 29-Jul. 3, 2009).
Samsung, "UL TPC in Rel.10," 3GPP TSG RAN WG1 #59bis, R1-100100, Valencia, Spain (Jan. 19-23, 2010).
Sharp, "CoMP Configuration for Multiple Component Carriers in LTE-A," 3GPP TSG RAN WG1 Meeting #56bis, R1-091134, Seoul, Korea (Mar. 23-27, 2009).
Third Generation Partnership Project, "Technical Specification Group Radio Access Network; Evolved Universal Terrestrial Radio Access (E-UTRA); Physical layer procedures (Release 8)," 3GPP TS 36.213 V8.8.0 (Sep. 2009).
Third Generation Partnership Project, "Technical Specification Group Radio Access Network; Evolved Universal Terrestrial Radio Access (E-UTRA); Physical layer procedures (Release 9)," 3GPP TS 36.213 V9.0.1 (Dec. 2009).
Third Generation Partnership Project, "Technical Specification Group Radio Access Network; Evolved Universal Terrestrial Radio Access (E-UTRA); Physical layer procedures (Release 9)," 3GPP TS 36.213 V9.3.0 (Sep. 2010).
Third Generation Partnership Project, "Technical Specification Group Radio Access Network; Evolved Universal Terrestrial Radio Access (E-UTRA); Physical layer procedures (Release 10)," 3GPP TS 36.213 V10.0.1 (Dec. 2010).
Third Generation Partnership Project, "Technical Specification Group Radio Access Network; Feasibility study for Further Advancements for E-UTRA (LTE-Advanced) (Release 9)," 3GPP TR 36.912 V9.1.0 (Dec. 2009).
Third Generation Partnership Project, "Technical Specification Group Radio Access Network; Feasibility study for Further Advancements for E-UTRA (LTE-Advanced) (Release 9)," 3GPP TR 36.912 V9.3.0 (Jun. 2010).
Third Generation Partnership Project, "Technical Specification Group Radio Access Network; Further Advancements for E-UTRA Physical Layer Aspects (Release 9)," 3GPP TR 36.814 V1.5.0 (Nov. 2009).
Third Generation Partnership Project, "Technical Specification Group Radio Access Network; Evolved Universal Terrestrial Radio Access (E-UTRA); Further advancements for E-UTRA physical layer aspects (Release 9)," 3GPP TR 36.814 V9.0.0 (Mar. 2010).
Third Generation Partnership Project, "Technical Specification Group Radio Access Network; Evolved Universal Terrestrial Radio Access (E-UTRA); Physical Channels and Modulation (Release 8)," 3GPP TS 36.211 V8.9.0 (Dec. 2009).
Third Generation Partnership Project, "Technical Specification Group Radio Access Network; Evolved Universal Terrestrial Radio Access (E-UTRA); Physical Channels and Modulation (Release 9)," 3GPP TS 36.211 V9.0.0 (Dec. 2009).
Third Generation Partnership Project, "Technical Specification Group Radio Access Network; Evolved Universal Terrestrial Radio Access (E-UTRA); Physical Channels and Modulation (Release 9)," 3GPP TS 36.211 V9.1.0 (Mar. 2010).
Third Generation Partnership Project, "Technical Specification Group Radio Access Network; Evolved Universal Terrestrial Radio Access (E-UTRA); Physical channels and modulation (Release 10)," 3GPP TS 36.211 V10.0.0 (Dec. 2010).
Third Generation Partnership Project, "Technical Specification Group Radio Access Network; Evolved Universal Terrestrial Radio Access (E-UTRA) Radio Resource Control (RRC); Protocol specification (Release 8)," 3GPP TS 36.331 V8.8.0 (Dec. 2009).
Third Generation Partnership Project, "Technical Specification Group Radio Access Network; Evolved Universal Terrestrial Radio Access (E-UTRA); Radio Resource Control (RRC); Protocol specification (Release 8)," 3GPP TS 36.331 V8.12.0 (Dec. 2010).
Third Generation Partnership Project, "Technical Specification Group Radio Access Network; Evolved Universal Terrestrial Radio Access (E-UTRA) Radio Resource Control (RRC); Protocol specification (Release 9)," 3GPP TS 36.331 V9.1.0 (Dec. 2009).
Third Generation Partnership Project, "Technical Specification Group Radio Access Network; Evolved Universal Terrestrial Radio Access (E-UTRA); Radio Resource Control (RRC); Protocol specification (Release 9)," 3GPP TS 36.331 V9.5.0 (Dec. 2010).
Third Generation Partnership Project, "Technical Specification Group Radio Access Network; Evolved Universal Terrestrial Radio Access (E-UTRA); Radio Resource Control (RRC); Protocol specification (Release 10)," 3GPP TS 36.331 V10.0.0 (Dec. 2010).
Third Generation Partnership Project, "Technical Specification Group Radio Access Network; Evolved Universal Terrestrial Radio Access (E-UTRA); Requirements for support of radio resource management (Release 8)," 3GPP TS 36.133 V8.8.0 (Dec. 2009).
Third Generation Partnership Project, "Technical Specification Group Radio Access Network; Evolved Universal Terrestrial Radio Access (E-UTRA); Requirements for support of radio resource management (Release 8)," 3GPP TS 36.133 V8.12.0 (Dec. 2010).
Third Generation Partnership Project, "Technical Specification Group Radio Access Network; Evolved Universal Terrestrial Radio Access (E-UTRA); Requirements for support of radio resource management (Release 9)," 3GPP TS 36.133 V9.2.0 (Dec. 2009).
Third Generation Partnership Project, "Technical Specification Group Radio Access Network; Evolved Universal Terrestrial Radio Access (E-UTRA); Requirements for support of radio resource management (Release 9)," 3GPP TS 36.133 V9.6.0 (Dec. 2010).
Third Generation Partnership Project, "Technical Specification Group Radio Access Network; Evolved Universal Terrestrial Radio Access (E-UTRA); Requirements for support of radio resource management (Release 10)," 3GPP TS 36.133 V10.1.0 (Dec. 2010).
Third Generation Partnership Project, "Technical Specification Group Radio Access Network; Evolved Universal Terrestrial Radio Access Network (E-UTRAN); X2 application protocol (X2AP) (Release 8)," 3GPP TS 36.423 V8.8.0 (Dec. 2009).
Third Generation Partnership Project, "Technical Specification Group Radio Access Network; Evolved Universal Terrestrial Radio Access Network (E-UTRAN); X2 application protocol (X2AP) (Release 8)," 3GPP TS 36.423 V8.9.0 (Mar. 2010).
Third Generation Partnership Project, "Technical Specification Group Radio Access Network; Evolved Universal Terrestrial Radio Access Network (E-UTRAN); X2 application protocol (X2AP) (Release 9)," 3GPP TS 36.423 V9.1.0 (Dec. 2009).
Third Generation Partnership Project, "Technical Specification Group Radio Access Network; Evolved Universal Terrestrial Radio Access Network (E-UTRAN); X2 application protocol (X2AP) (Release 9)," 3GPP TS 36.423 V9.5.0 (Dec. 2010).
Third Generation Partnership Project, "Technical Specification Group Radio Access Network; Evolved Universal Terrestrial Radio Access Network (E-UTRAN); X2 application protocol (X2AP) (Release 10)," 3GPP TS 36.423 V10.0.0 (Dec. 2010).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.11.0 (Dec. 2009).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.12.0 (Mar. 2010).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP TS 36.300 V9.2.0 (Dec. 2009).
Third Generation Partnership Project, "Technical Specification Group Radio Access Network; Evolved Universal Terrestrial Radio Access

(56) References Cited

OTHER PUBLICATIONS (E-UTRA) and Evolved Universal Terrestrial Radio Access Network (E-UTRAN); Overall description; Stage 2 (Release 9)," 3GPP TS 36.300 V9.6.0 (Dec. 2010).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," 3GPP TS 36.300 V10.2.0 (Dec. 2010).

Third Generation Partnership Project, "Technical Specification Group Radio Access Network; Evolved Universal Terrestrial Radio Access (E-UTRA) Medium Access Control (MAC) protocol specification (Release 8)," 3GPP TS 36.321 V8.8.0 (Dec. 2009).

Third Generation Partnership Project, "Technical Specification Group Radio Access Network; Evolved Universal Terrestrial Radio Access (E-UTRA); Medium Access Control (MAC) protocol specification (Release 8)," 3GPP TS 36.321 V8.9.0 (Jun. 2010).

Third Generation Partnership Project, "Technical Specification Group Radio Access Network; Evolved Universal Terrestrial Radio Access (E-UTRA) Medium Access Control (MAC) protocol specification (Release 9)," 3GPP TS 36.321 V9.1.0 (Dec. 2009).

Third Generation Partnership Project, "Technical Specification Group Radio Access Network; Evolved Universal Terrestrial Radio Access (E-UTRA); Medium Access Control (MAC) protocol specification (Release 9)," 3GPP TS 36.321 V9.3.0 (Jun. 2010).

Third Generation Partnership Project, "Technical Specification Group Radio Access Network; Evolved Universal Terrestrial Radio Access (E-UTRA); Medium Access Control (MAC) protocol specification (Release 10)," 3GPP TS 36.321 V10.0.0 (Dec. 2010).

Third Generation Partnership Project, "Technical Specification Group Radio Access Network; Evolved Universal Terrestrial Radio Access (E-UTRA); Physical Channels and Modulation (Release 8)," 3GPP TS 36.211 V8.6.0 (Mar. 2009).

TSG-RAN WG4, "Reply LS on RAN2 status on carrier aggregation," 3GPP TSG RAN WG4 Meeting #51bis, R4-09xxxx (R4-092488), Los Angeles, USA (Jun. 29-Jul. 2, 2009).

TSG-RAN WG4, "Reply LS on RAN2 status on carrier aggregation," 3GPP TSG RAN WG2 Meeting #67bis, R2-095422, Miyazaki, Japan (Oct. 12-16, 2009).

Motorola, "Release 10 UE PUCCH/PUSCH configuration," 03GPP TSG-RAN Meeting Ad Hoc #2010-01, R4-100207, Sophia Antipolis, France (Jan. 18-22, 2010).

Nokia Siemens Networks, "Stage 2 description of Carrier Aggregation," 3GPP TSG-RAN WG2 Meeting #68bis, R2-100789, Valencia, Spain, (Jan. 18-22, 2010).

Third Generation Partnership Project, "Technical Specification Group Radio Access Network; Evolved Universal Terrestrial Radio Access (E-UTRA); User Equipment (UE) radio transmission and reception (Release 9)," 3GPP TS 36.101 V9.2.0 (Dec. 2009).

Third Generation Partnership Project, "Technical Specification Group Radio Access Network; Evolved Universal Terrestrial Radio Access (E-UTRA); User Equipment (UE) radio transmission and reception (Release 9)," 3GPP TS 36.101 V9.6.0 (Dec. 2010).

Third Generation Partnership Project, "Technical Specification Group Radio Access Network; Evolved Universal Terrestrial Radio Access (E-UTRA); User Equipment (UE) radio transmission and reception (Release 10)," 3GPP TS 36.101 V10.1.1 (Jan. 2011).

* cited by examiner

METHOD AND APPARATUS FOR ENHANCING CELL-EDGE USER PERFORMANCE AND SIGNALING RADIO LINK FAILURE CONDITIONS VIA DOWNLINK COOPERATIVE COMPONENT CARRIERS

CROSS REFERENCE TO RELATED APPLICATIONS

This application is a continuation of U.S. patent application Ser. No. 14/684,931, filed Apr. 13, 2015, which is a continuation of U.S. patent application Ser. No. 13/577,549 filed Feb. 27, 2013, which is a 371 application of International Application No. PCT/US2011/024736, filed Feb. 14, 2011, which claims the benefit of: U.S. Provisional Patent Application No. 61/303,967, filed Feb. 12, 2010, U.S. Provisional Patent Application No. 61/304,217, filed Feb. 12, 2010, and U.S. Provisional Patent Application No. 61/304,371, filed Feb. 12, 2010, the contents of which are hereby incorporated by reference herein.

BACKGROUND

In current and evolving cellular systems, it is generally very difficult to offer a uniform user experience, (e.g., throughput, quality of service (QoS), and the like), because at cell-edge the user-experience is limited by interference from other cells. This problem is even severe when the frequency reuse factor is one. It has been proposed that different cells may use different sets of component carriers (CCs). However, this scheme leads to an effective frequency reuse factor being greater than one, which is not favorable for a traditional macro-cell scenario to maintain efficient spectrum utilization.

Furthermore, the support of multiple CCs for carrier aggregation (CA) is typically limited to one serving evolved Node-B (eNB). This excludes the possibility for a standard compliant wireless transmit/receive unit (WTRU) to maintain a data connection simultaneously with CCs on different eNBs.

It may be desirable to provide a method and apparatus for simultaneously connecting a WTRU to several different transmission sites on different CCs in order to improve cell-edge performance.

SUMMARY

A wireless communication network and method are described for enhancing cell-edge performance of a wireless transmit/receive unit (WTRU). The WTRU may establish a connection with a plurality of sites via respective downlinks (DLs). Each DL may include at least one DL component carrier (CC) that operates on a frequency that is the same or different than one or more of the other DL CCs. The sites may manipulate their transmit power for a particular DL CC operating frequency such that the distance from a particular one of the sites to its cell boundary may become larger by increasing its transmit power on the particular DL CC operating frequency, and the distance from at least one of the other sites to its respective cell boundary may become smaller by decreasing its transmit power on the particular DL CC operating frequency. Thus, a coverage overlap between different CC frequencies may be created while maintaining a frequency reuse pattern of one. The WTRU may avoid the cell-edge of at least one CC frequency by performing a handover between different CC frequencies. The WTRU may achieve throughput performance improvement at the traditional cell-edge by selectively accessing multiple CCs from different sites that may not be near a cell-edge of a CC frequency.

BRIEF DESCRIPTION OF THE DRAWINGS

A more detailed understanding may be had from the following description, given by way of example in conjunction with the accompanying drawings wherein.

DETAILED DESCRIPTION

Figure 1:
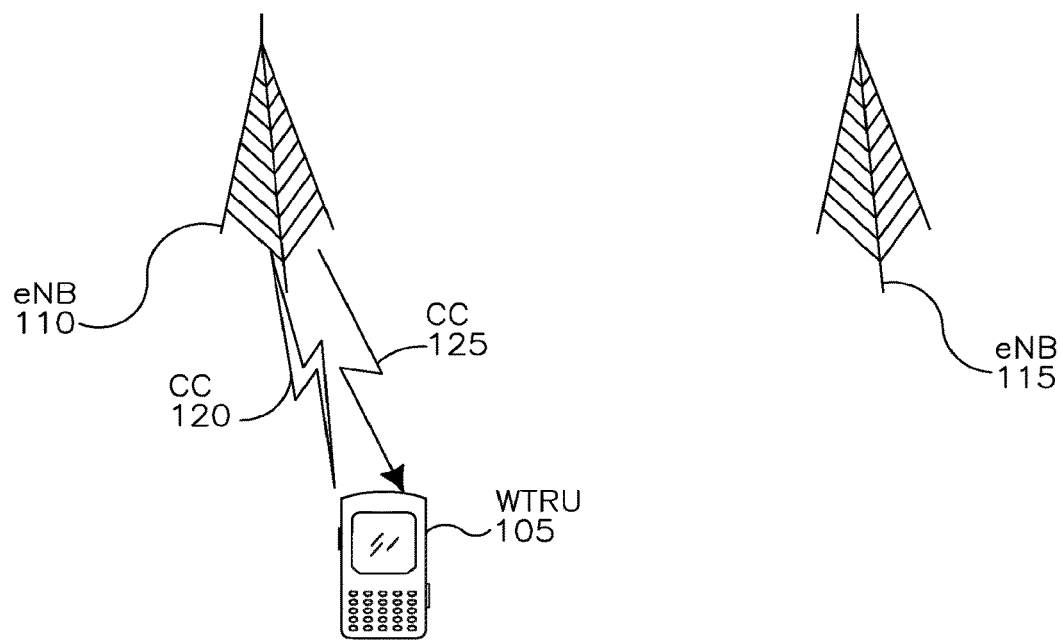
FIG. 1 shows an example of an certain wireless communication systems with multiple component carriers (CCs) cooperatively configured such that a WTRU may aggregate CC bandwidth to increase data transfer rate.

When referred to hereafter, the terminology "wireless transmit/receive unit (WTRU)" includes but is not limited to a user equipment (WTRU), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, an evolved Node-B (eNB), a site controller, an access point (AP), or any other type of interfacing device capable of operating in a wireless environment.

A wireless communication system supporting higher data rates and spectrum efficiency may use a DL transmission scheme that is based on an orthogonal frequency-division multiple access (OFDMA) air interface. For the uplink (UL) direction, single-carrier (SC) transmission based on discrete Fourier transform (DFT)-spread OFDMA (DFT-S-OFDMA)

may be used. The use of single-carrier transmission in the UL may be motivated by the lower peak-to-average power ratio (PAPR), as compared to multi-carrier transmission such as orthogonal frequency division multiplexing (OFDM).

In order to further improve achievable throughput and coverage of wireless communication radio access systems, and in order to meet the international mobile telecommunications (IMT) advanced requirements of 1 Gbps and 500 Mbps peak data rates in the DL and UL directions respectively, several carriers may be aggregated in order to increase the maximum transmission bandwidth from 20 MHz up to 100 MHz, while supporting a flexible bandwidth arrangement feature. Each carrier, (i.e., component carrier (CC)), may have a maximum bandwidth of 20 MHz. CA is supported in the DL and the UL. Additionally, different CCs may have different coverage.

The concept of CA using multiple CCs is relevant for wireless transmit/receive units (WTRUs) in a radio resource control (RRC) connected state. An idle WTRU will access the network via a single UL and DL carrier pair. CA may be supported on a single evolved Node-B (eNB). When CA is implemented, a cell is identified by a unique evolved universal mobile telecommunications system (E-UMTS) terrestrial radio access network (E-UTRAN) cell global identity (ECGI), and the cell corresponds to the transmission of system information in one CC. An anchor carrier is a carrier that provides system information, synchronization and paging for a certain cell. Furthermore, anchor carriers enable synchronization, camping, access and reliable control coverage in a heterogeneous network environment where interference coordination provides for at least one detectable (accessible) anchor carrier from a WTRU perspective. In that context, WTRU-specific anchor carriers may be considered to be a subset of the cell specific anchor carriers. A WTRU-specified anchor carrier may be used to carry multiple separate physical DL control channels (PDCCHs), each PDCCH corresponding to one CC.

In certain wireless communication systems, the following three parameters may be signaled from higher layers to manage DL power allocation: Reference-signal-power, $\rho_A$ and $\rho_B$. These parameters are used to determine cell specific DL reference signal (RS) energy per resource element (EPRE), the WTRU specific ratio of physical DL shared channel (PDSCH) EPRE over cell specific RS EPRE ($\rho_A$ or $\rho_B$), and the cell-specific ratio $\rho_B/\rho_A$. The eNB may determine the DL transmit EPRE, and the WTRU may assume that DL cell-specific RS EPRE is constant across the DL system bandwidth and constant across all subframes until different cell-specific RS power information is received. The DL reference-signal EPRE may be derived from the DL reference-signal transmit power given by the parameter Reference-signal-power provided by higher layers. The DL reference-signal transmit power is defined as the linear average over the power contributions of all resource elements that carry cell-specific reference signals within the operating system bandwidth. The ratio of PDSCH EPRE to cell-specific RS EPRE among PDSCH resource elements (REs) for each OFDM symbol may be denoted by either $\rho_A$ or $\rho_B$ according to the OFDM symbol index which are functions of $\rho_A$ and $\rho_B$.

In certain wireless communication systems, the Reference-signal-power, $\rho_A$ and $\rho_B$ parameters may be provided by RRC peer messages in a PDSCH-Config information element (IE). There are two ways that a WTRU may obtain the PDSCH-Config IE. In idle mode, the WTRU may retrieve the default radio bearer configuration that includes the PDSCH-Config from system information block 2 (SIB2) when camping onto a cell. Upon transitioning from the idle mode to an active mode, the WTRU may use a stored default radio bearer configuration (including PDSCH-Config) to establish an initial RRC connection. Once the WTRU is in an active mode, an RRC Connection Reconfiguration message may be used by a network to provide the PDSCH-Config IE contained in a MobilityControlInfo IE to the WTRU. The PDSCH-Info may be provided along with physical cell ID and frequency, such that the network may control to where the WTRU may be connected during the active mode. In the case of a handover (HO), the physical DL shared channel (PDSCH)-Config of a target eNB is obtained by the serving eNB via X2 signaling while preparing to perform the handover.

FIG. 1 shows an example of a wireless communication system 100 including a WTRU 105 and two sites, (eNBs 110 and 115). The system 100 is configured such that the WTRU 105 may aggregate CC bandwidth to increase data transfer rate. As shown in FIG. 1, the WTRU 105 communicates only with the eNB 110 via two separate CCs: CC 120 and CC 125. There may be specific limitations, (e.g., no granting mechanism, timing advance, channel quality indicator (CQI) signaling, positive acknowledgement (ACK)/negative acknowledgement (NACK) signaling, and the like), that prohibit a WTRU from receiving data on CCs from different sites.

Figure 2:
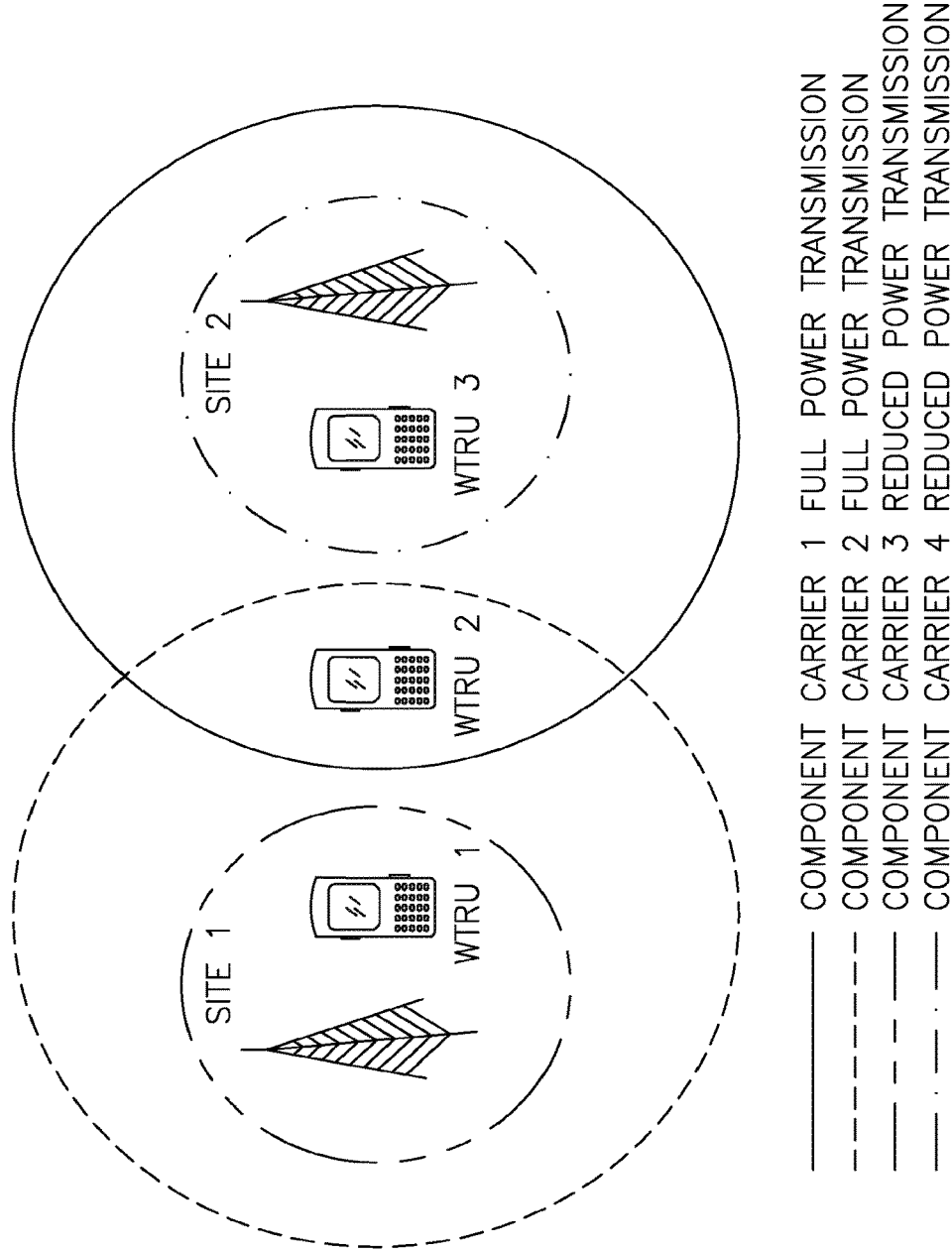
FIG. 2 shows an example of a wireless communication system where two DL CCs may be configured on each site with a different transmit power, creating a region of cell coverage overlap but from a different CC associated with a different site.

For example, FIG. 2 shows one possible wireless communication system configuration where two DL CCs may be configured. Each site transmits on a CC with a different power, (i.e., either full power or reduced power). All of the WTRUs experience an acceptable level of signal-to-interference plus noise ratio (SINR) on a given CC. FIG. 2 shows a scenario where the WTRU 105 is in the position of WTRU 1, where both CC 2 and CC3 may be accessible. If WTRU 105 is in the position of WTRU 3, both CC 1 and CC 4 may be accessible. When WTRU 105 is in the position of WTRU 2, only one of CC 1 or CC 2 is accessible. If, for example, WTRU 105 is accessing CC 2 on Site 1, a network radio resource management (RRM) entity (not shown) may determine whether or not a handover is to be performed to drop CC 2, in order to access CC 1 on Site 1, rather than taking full benefit of the data throughput increase by using multiple CCs from a different site.

For example, if there are two UL CC (UC) frequencies per site, UC frequency 1 and UC frequency 2, the path losses between WTRU 1 and Site 1 on each of these UL CC frequencies may be smaller than the path loss to Site 2. Similarly, for WTRU 3, the path loss to Site 2 may be more favorable. For WTRU 2, however, the UL channel quality may be different than the DL signal quality. Thus, it may be possible that the path losses on both UC frequency 1 and UC frequency 2 may be smaller to Site 1, even though the DL transmission on CC1 is received from Site 2 due to the increased transmission power on CC1 by Site 2.

Figure 3A:
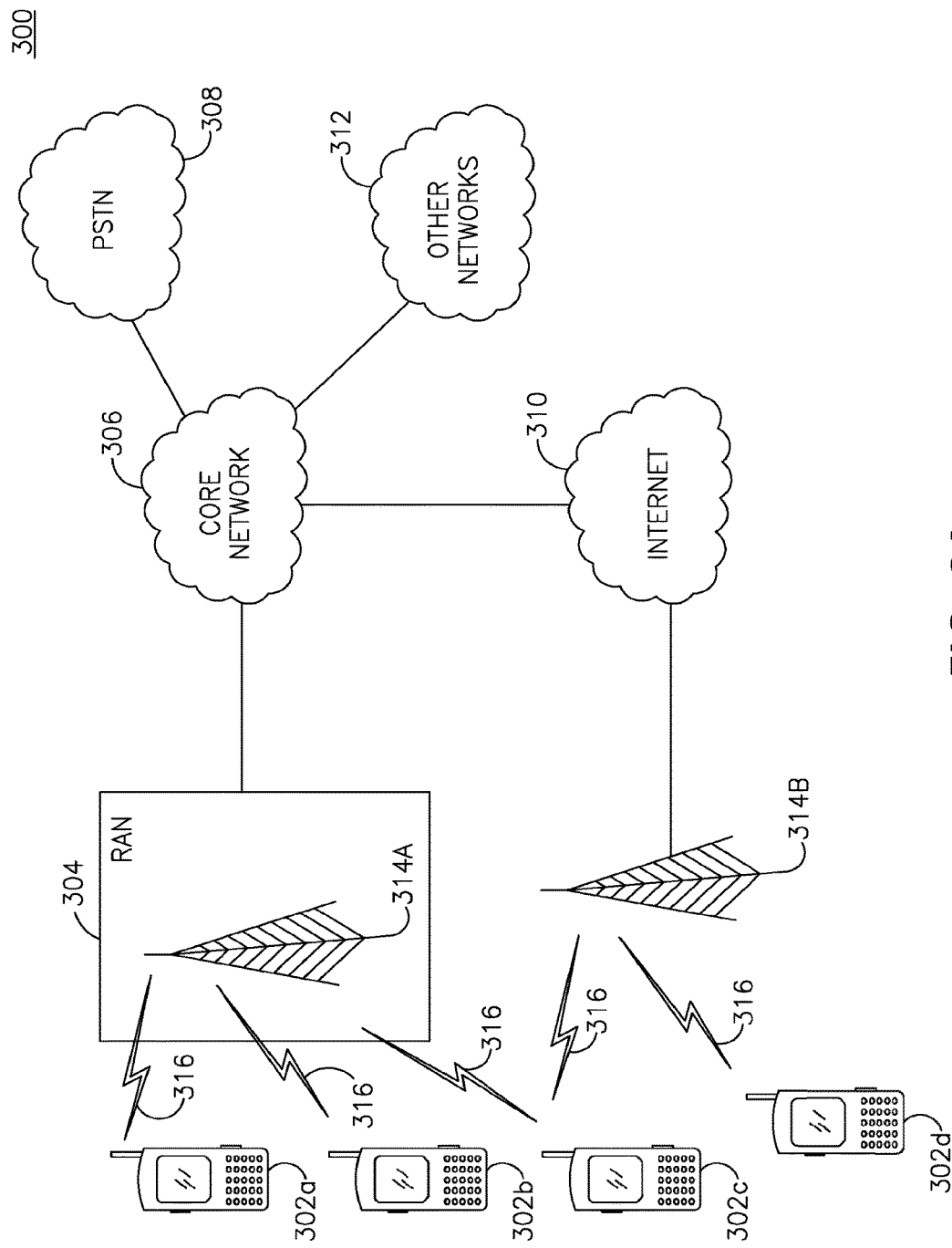
FIG. 3A shows an example communications system in which one or more disclosed embodiments may be implemented.

FIG. 3A shows an example communications system 300 in which one or more disclosed embodiments may be implemented. The communications system 300 may be a multiple access system that provides content, such as voice, data, video, messaging, broadcast, etc., to multiple wireless users. The communications system 300 may enable multiple wireless users to access such content through the sharing of system resources, including wireless bandwidth. For example, the communications system 300 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 3A, the communications system 300 may include WTRUs 302a, 302b, 302c, 302d, a radio access network (RAN) 304, a core network 306, a public switched telephone network (PSTN) 308, the Internet 310, and other networks 312, though it will be appreciated that the disclosed embodiments contemplate any number of WTRUs, base stations, networks, and/or network elements. Each of the WTRUs 302a, 302b, 302c, 302d may be any type of device configured to operate and/or communicate in a wireless environment. By way of example, the WTRUs 302a, 302b, 302c, 302d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 300 may also include a base station 314a and a base station 314b. Each of the base stations 314a, 314b may be any type of device configured to wirelessly interface with at least one of the WTRUs 302a, 302b, 302c, 302d to facilitate access to one or more communication networks, such as the core network 306, the Internet 310, and/or the other networks 312. By way of example, the base stations 314a, 314b may be a base transceiver station (BTS), a Node-B, an eNB, a Home Node-B (HNB), a Home eNB (HeNB), a site controller, an access point (AP), a wireless router, a remote radio head (RRH), and the like. While the base stations 314a, 314b are each depicted as a single element, it will be appreciated that the base stations 314a, 314b may include any number of interconnected base stations and/or network elements.

The base station 314a may be part of the RAN 304, which may also include other base stations and/or network elements (not shown), such as a base station controller (BSC), a radio network controller (RNC), relay nodes, and the like. The base station 314a and/or the base station 314b may be configured to transmit and/or receive wireless signals within a particular geographic region, which may be referred to as a cell (not shown). The cell may further be divided into cell sectors. For example, the cell associated with the base station 314a may be divided into three sectors. Thus, in one embodiment, the base station 314a may include three transceivers, i.e., one for each sector of the cell. In another embodiment, the base station 314a may employ multiple-input multiple-output (MIMO) technology and, therefore, may utilize multiple transceivers for each sector of the cell.

The base stations 314a, 314b may communicate with one or more of the WTRUs 302a, 302b, 302c, 302d over an air interface 316, which may be any suitable wireless communication link (e.g., radio frequency (RF), microwave, infrared (IR), ultraviolet (UV), visible light, and the like). The air interface 316 may be established using any suitable radio access technology (RAT).

More specifically, the communications system 300 may be a multiple access system and may employ one or more channel access schemes, such as CDMA, TDMA, FDMA, OFDMA, SC-FDMA, and the like. For example, the base station 314a in the RAN 304 and the WTRUs 302a, 302b, 302c may implement a radio technology such as universal mobile telecommunications system (UMTS) terrestrial radio access (UTRA), which may establish the air interface 316 using wideband CDMA (WCDMA). WCDMA may include communication protocols such as high-speed packet access (HSPA) and/or evolved HSPA (HSPA+). HSPA may include high-speed DL packet access (HSDPA) and/or high-speed UL packet access (HSUPA).

In another embodiment, the base station 314a and the WTRUs 302a, 302b, 302c may implement a radio technology such as evolved UTRA (E-UTRA), which may establish the air interface 316 using long term evolution (LTE) and/or LTE-Advanced (LTE-A).

In other embodiments, the base station 314a and the WTRUs 302a, 302b, 302c may implement radio technologies such as IEEE 802.16 (i.e., worldwide interoperability for microwave access (WiMAX)), CDMA2000, CDMA2000 1×, CDMA2000 evolution data optimized (EV-DO), Interim Standard 2000 (IS-2000), Interim Standard 95 (IS-95), Interim Standard 856 (IS-856), global system for mobile communications (GSM), enhanced data rates for GSM evolution (EDGE), GSM/EDGE RAN (GERAN), and the like.

The base station 314b in FIG. 3A may be a wireless router, a Node B, a HNB, a combination of an RNC and Node-B, an eNB, a HeNB, an RRH with an associated base station, or an AP, for example, and may utilize any suitable RAT for facilitating wireless connectivity in a localized area, such as a place of business, a home, a vehicle, a campus, and the like. In one embodiment, the base station 314b and the WTRUs 302c, 302d may implement a radio technology such as IEEE 802.11 to establish a wireless local area network (WLAN). In another embodiment, the base station 314b and the WTRUs 302c, 302d may implement a radio technology such as IEEE 802.15 to establish a wireless personal area network (WPAN). In yet another embodiment, the base station 314b and the WTRUs 302c, 302d may utilize a cellular-based RAT, (e.g., WCDMA, CDMA2000, GSM, LTE, LTE-A, and the like) to establish a picocell or femtocell. As shown in FIG. 3A, the base station 314b may have a direct connection to the Internet 310. Thus, the base station 314b may not be needed to access the Internet 310 via the core network 306.

The RAN 304 may be in communication with the core network 306, which may be any type of network configured to provide voice, data, applications, and/or voice over Internet protocol (VoIP) services to one or more of the WTRUs 302a, 302b, 302c, 302d. For example, the core network 306 may provide call control, billing services, mobile location-based services, pre-paid calling, Internet connectivity, video distribution, and the like, and/or perform high-level security functions, such as user authentication. Although not shown in FIG. 3A, it will be appreciated that the RAN 304 and/or the core network 306 may be in direct or indirect communication with other RANs that employ the same RAT as the RAN 304 or a different RAT. For example, in addition to being connected to the RAN 304, which may be utilizing an E-UTRA radio technology, the core network 306 may also be in communication with another RAN (not shown) employing a GSM radio technology.

The core network 306 may also serve as a gateway for the WTRUs 302a, 302b, 302c, 302d to access the PSTN 308, the Internet 310, and/or other networks 312. The PSTN 308 may include circuit-switched telephone networks that provide plain old telephone service (POTS). The Internet 310 may include a global system of interconnected computer networks and devices that use common communication protocols, such as the transmission control protocol (TCP), user datagram protocol (UDP) and the Internet protocol (IP) in the TCP/IP suite. The networks 312 may include wired or wireless communications networks owned and/or operated by other service providers. For example, the networks 312 may include another core network connected to one or more RANs, which may employ the same RAT as the RAN 304 or a different RAT.

Some or all of the WTRUs 302a, 302b, 302c, 302d in the communications system 300 may include multi-mode capabilities, i.e., the WTRUs 302a, 302b, 302c, 302d may include multiple transceivers for communicating with different wireless networks over different wireless links. For example, the WTRU 302c shown in FIG. 3A may be configured to communicate with the base station 314A, which may employ a cellular-based radio technology, and with the base station 314B, which may employ an IEEE 802 radio technology.

Figure 3B:
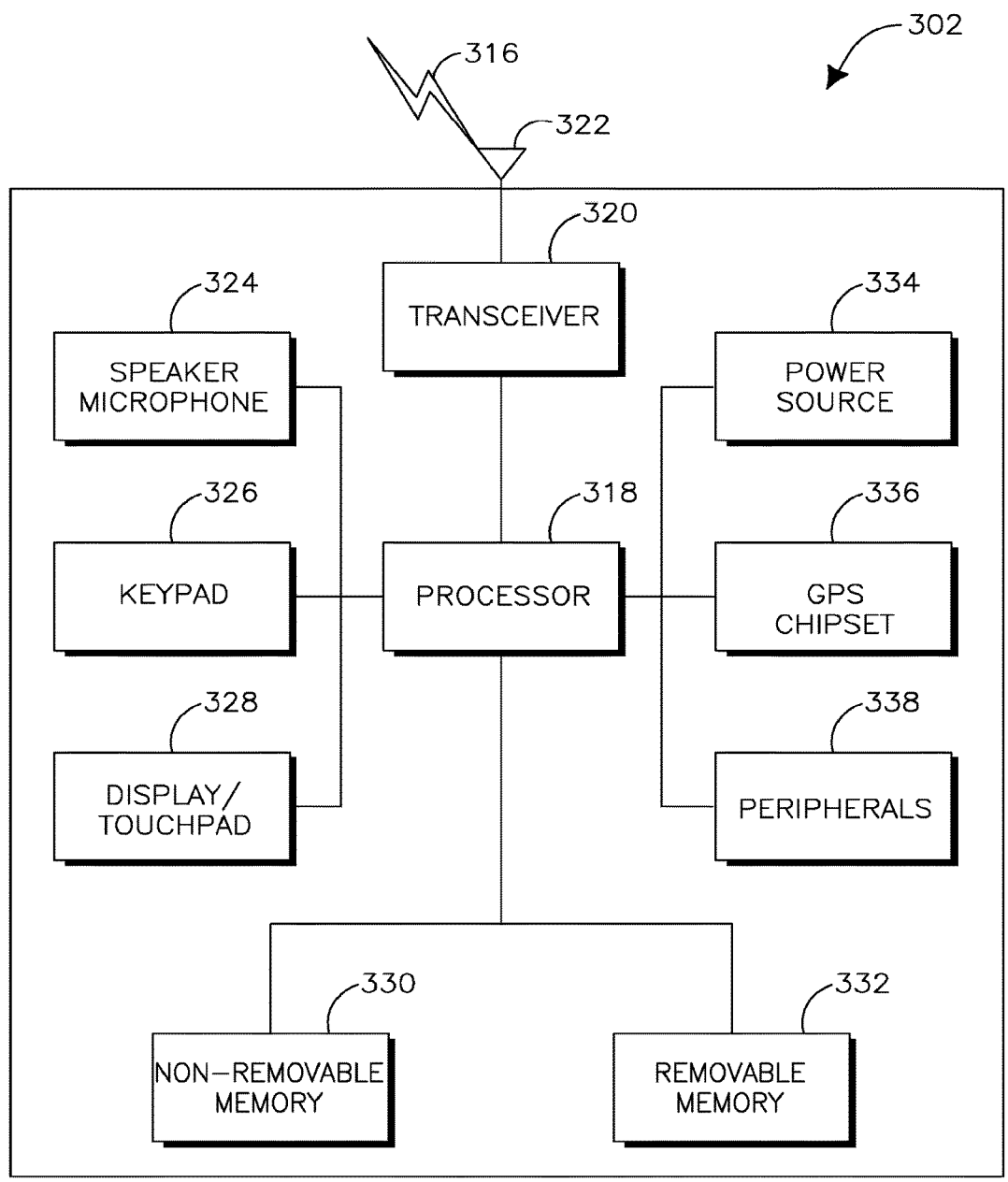
FIG. 3B shows an example wireless transmit/receive unit (WTRU) that may be used within the communications system shown in FIG. 3A.

FIG. 3B shows an example WTRU 302 that may be used within the communication system 100 shown in FIG. 3A. As shown in FIG. 3B, the WTRU 302 may include a processor 318, a transceiver 320, a transmit/receive element 322, (e.g., an antenna), a speaker/microphone 324, a keypad 326, a display/touchpad 328, a non-removable memory 330, a removable memory 332, a power source 334, a global positioning system (GPS) chipset 336, and peripherals 338. It will be appreciated that the WTRU 302 may include any sub-combination of the foregoing elements while remaining consistent with an embodiment.

The processor 318 may be a general purpose processor, a special purpose processor, a conventional processor, a digital signal processor (DSP), a microprocessor, one or more microprocessors in association with a DSP core, a controller, a microcontroller, an application specific integrated circuit (ASIC), a field programmable gate array (FPGA) circuit, an integrated circuit (IC), a state machine, and the like. The processor 318 may perform signal coding, data processing, power control, input/output processing, and/or any other functionality that enables the WTRU 302 to operate in a wireless environment. The processor 318 may be coupled to the transceiver 320, which may be coupled to the transmit/receive element 322. While FIG. 3B depicts the processor 318 and the transceiver 320 as separate components, the processor 318 and the transceiver 320 may be integrated together in an electronic package or chip.

The transmit/receive element 322 may be configured to transmit signals to, or receive signals from, a base station (e.g., the base station 314a) over the air interface 316. For example, in one embodiment, the transmit/receive element 322 may be an antenna configured to transmit and/or receive RF signals. In another embodiment, the transmit/receive element 322 may be an emitter/detector configured to transmit and/or receive IR, UV, or visible light signals, for example. In yet another embodiment, the transmit/receive element 322 may be configured to transmit and receive both RF and light signals. The transmit/receive element 322 may be configured to transmit and/or receive any combination of wireless signals.

In addition, although the transmit/receive element 322 is depicted in FIG. 3B as a single element, the WTRU 302 may include any number of transmit/receive elements 322. More specifically, the WTRU 302 may employ MIMO technology. Thus, in one embodiment, the WTRU 302 may include two or more transmit/receive elements 322 (e.g., multiple antennas) for transmitting and receiving wireless signals over the air interface 316.

The transceiver 320 may be configured to modulate the signals that are to be transmitted by the transmit/receive element 322 and to demodulate the signals that are received by the transmit/receive element 322. The WTRU 302 may have multi-mode capabilities. Thus, the transceiver 320 may include multiple transceivers for enabling the WTRU 302 to communicate via multiple RATs, such as UTRA and IEEE 802.11, for example.

The processor 318 of the WTRU 302 may be coupled to, and may receive user input data from, the speaker/microphone 324, the keypad 326, and/or the display/touchpad 328 (e.g., a liquid crystal display (LCD) display unit or organic light-emitting diode (OLED) display unit). The processor 318 may also output user data to the speaker/microphone 324, the keypad 326, and/or the display/touchpad 328. In addition, the processor 318 may access information from, and store data in, any type of suitable memory, such as the non-removable memory 330 and/or the removable memory 332. The non-removable memory 330 may include random-access memory (RAM), read-only memory (ROM), a hard disk, or any other type of memory storage device. The removable memory 332 may include a subscriber identity module (SIM) card, a memory stick, a secure digital (SD) memory card, and the like. In other embodiments, the processor 318 may access information from, and store data in, memory that is not physically located on the WTRU 302, such as on a server or a home computer (not shown).

Figure 3C:
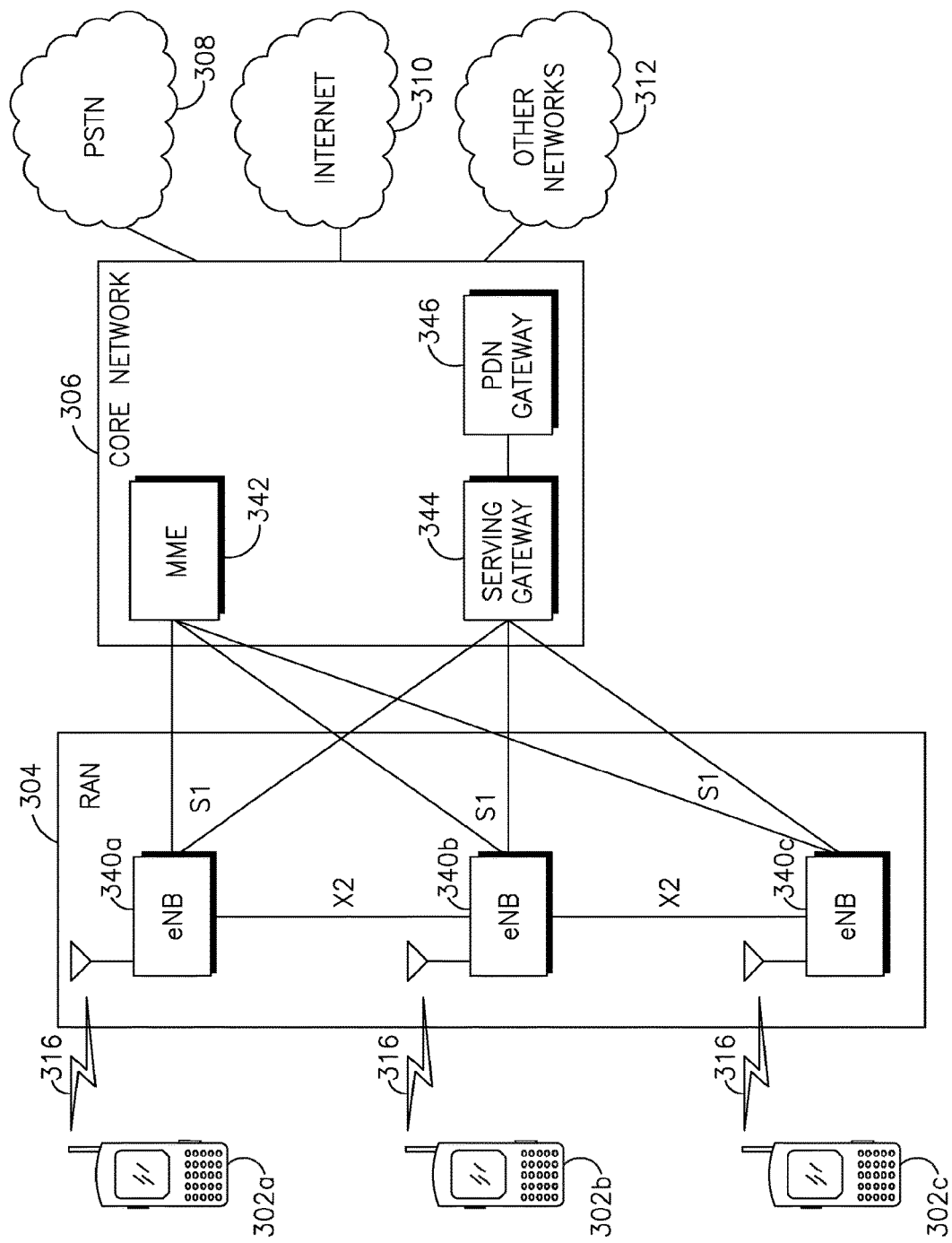
FIG. 3C shows an example radio access network and an example core network that may be used within the communications system shown in FIG. 3A.

FIG. 3C shows an example RAN 304 and an example core network 306 that may be used within the communication system 100 shown in FIG. 3A. The RAN 304 may employ an E-UTRA, a WCDMA or a GSM radio technology to communicate with the WTRUs 302a, 302b, 302c over the air interface 316. The RAN 304 may also be in communication with the core network 306.

The RAN 304 may include eNBs 340a, 340b, 340c, though it will be appreciated that the RAN 304 may include any number of eNBs while remaining consistent with an embodiment. The eNBs 340a, 340b, 340c may each include one or more transceivers for communicating with the WTRUs 302a, 302b, 302c over the air interface 316. In one embodiment, the eNBs 340a, 340b, 340c may implement MIMO technology. Thus, the eNB 340a, for example, may use multiple antennas to transmit wireless signals to, and receive wireless signals from, the WTRU 302a.

Each of the eNBs 340a, 340b, 340c may be associated with a particular cell (not shown) and may be configured to handle radio resource management decisions, handover decisions, scheduling of users in the UL and/or DL, and the like. As shown in FIG. 3C, the eNBs 340a, 340b, 340c may communicate with one another over an X2 interface.

The core network 306 shown in FIG. 3C may include a mobility management gateway (MME) 342, a serving gateway (S-GW) 344, and a packet data network (PDN) gateway 346. While each of the foregoing elements are depicted as part of the core network 306, it will be appreciated that any one of these elements may be owned and/or operated by an entity other than the core network operator.

The MME 342 may be connected to each of the eNBs 342a, 342b, 342c in the RAN 304 via an S1 interface and may serve as a control node. For example, the MME 342 may be responsible for authenticating, managing and storing contexts of users of the WTRUs 302a, 302b, 302c, bearer activation/deactivation, selecting a particular serving gateway during an initial attach of the WTRUs 302a, 302b, 302c, and the like. The MME 342 may also provide a control plane function for switching between the RAN 304 and other RANs (not shown) that employ other radio technologies, such as GSM or WCDMA. The MME 342 may be a gateway general packet radio service (GPRS) support node. The S-GW 344 may be connected to each of the eNBs 340a, 340b, 340c in the RAN 304 via the S1 interface. The S-GW 344 may generally route and forward user data packets to/from the WTRUs 302a, 302b, 302c. The S-GW 344 may also perform other functions, such as anchoring user planes during inter-eNB handovers, triggering paging when DL data is available for the WTRUs 302a, 302b, 302c. The S-GW 344 may be a serving general packet radio service (GPRS) support node (SGSN).

The S-GW 344 may also be connected to the PDN gateway 346, which may provide the WTRUs 302a, 302b, 302c with access to packet-switched networks, such as the Internet 110, to facilitate communications between the WTRUs 302a, 302b, 302c and IP-enabled devices.

The core network 306 may facilitate communications with other networks. For example, the core network 306 may provide the WTRUs 302a, 302b, 302c with access to circuit-switched networks, such as the PSTN 308, to facilitate communications between the WTRUs 302a, 302b, 302c and traditional land-line communications devices. For example, the core network 106 may include, or may communicate with, an IP gateway (e.g., an IP multimedia subsystem (IMS) server) that serves as an interface between the core network 306 and the PSTN 308. In addition, the core network 306 may provide the WTRUs 302a, 302b, 302c with access to the networks 312, which may include other wired or wireless networks that are owned and/or operated by other service providers.

For the purpose of flexible deployment, certain wireless communication systems support scalable transmission bandwidths of either 1.4, 3, 5, 10, 15 or 20 MHz. These systems may operate in either frequency division duplex (FDD), time division duplex (TDD) or half-duplex FDD modes.

In certain wireless communication systems, each radio frame (10 ms) may consist of 10 equally sized sub-frames of one (1) ms each. Each sub-frame may consist of two equally sized timeslots of 0.5 ms each. There may be either seven (7) or six (6) OFDM symbols per timeslot. Seven (7) symbols may be used with normal cyclic prefix length, and 6 symbols per timeslot in an alternative system configuration may be used with the extended cyclic prefix length. The sub-carrier spacing for these systems may be 15 kHz. An alternative reduced sub-carrier spacing mode using 7.5 kHz is also possible. A resource element (RE) may correspond to one (1) sub-carrier during one (1) OFDM symbol interval. Twelve (12) consecutive sub-carriers during a 0.5 ms timeslot may constitute one (1) resource block (RB). Therefore, with seven (7) symbols per timeslot, each RB may consist of 12×7=84 RE's. A DL carrier may consist of a scalable number of resource blocks (RBs), ranging from a minimum of 6 RBs up to a maximum of 100 RBs. This corresponds to an overall scalable transmission bandwidth of roughly one (1) MHz up to twenty (20) MHz. However, a set of common transmission bandwidths may be specified, (e.g., 1.4, 3, 5, 10 or 20 MHz). The basic time-domain unit for dynamic scheduling may be one sub-frame comprising two consecutive timeslots, (i.e., a resource-block pair). Certain sub-carriers on some OFDM symbols may be allocated to carry pilot signals in the time-frequency grid. A given number of sub-carriers at the edges of the transmission bandwidth may not be transmitted in order to comply with the spectral mask requirements.

In the DL direction, a WTRU may be allocated by the eNB to receive its data anywhere across the entire transmission bandwidth, e.g., an OFDMA scheme may be used. The DL may have an unused direct current (DC) offset sub-carrier in the center of the spectrum.

DL grants may be carried on a PDCCH. To support bandwidth aggregation, separate PDCCH coding, (e.g., a separate coding means that the PDCCH message for different CCs is encoded using a separate cyclic redundancy check (CRC) and a convolutional code), may be used to schedule DL resources with the following two options:

1) Option 1a: separate PDCCHs on each carrier may be used to schedule DL resources of that carrier; and 2) Option 1b: one PDCCH channel with separate coding on a given carrier may be used to schedule resources on multiple carriers by means of a carrier indicator (CI) field.

A WTRU may be used to monitor a set of PDCCH candidates for control information in every non-discontinuous reception (DRX) subframe, where monitoring implies attempting to decode each of the PDCCHs in the set according to various monitored DL control information (DCI) formats.

In certain wireless communication systems, the DCI formats a WTRU monitors may be divided into WTRU-specific search space and common search space. For WTRU-specific search space, the WTRU may monitor DCI 0/1A and DCI, which may be semi-statically configured via RRC signaling, depending on the transmission mode. A PDCCH DL monitoring set may be defined, which comprises the DL CCs from the WTRU DL CC set on which a WTRU may be configured to receive scheduling assignments for cross-carrier scheduling. The WTRU may not have to perform blind decoding in DL CCs on which it is not configured to receive PDCCH, which reduces the probability of PDCCH false detection.

The WTRU may have one RRC connection with the network. The addition and removal of CCs may be performed without an RRC connection HO, as long as in case of removal, the CC being removed is not a special cell. A special cell may be primary component carrier (PCC) or the carrier that provides the control plane signaling exchange for the WTRU.

Separate activation/deactivation may be allowed, either using medium access control (MAC) or physical (PHY) techniques. The CCs may exist in two states: 1) configured but deactivated; and 2) activated. In the DL, the WTRU may not receive PDCCH or PDSCH on deactivated CCs. On activated carriers, the WTRU may receive PDSCH, and PDCCH, if present. Further, the WTRU may not be used to perform CQI measurements on deactivated CCs. For the UL, an explicit activation/deactivation procedure may not be introduced.

The network may configure mobility measurements to support WTRU inter-site handover based on reference signal received power (RSRP) or reference signal received quality (RSRQ). There are multiple ways to report neighbor cell measurements. For example, the WTRU may be configured to measure neighbor cell power on event or periodic reporting basis. The network relies on these neighbor cell measurements from the WTRU to make decisions on when to handover a WTRU to a different site within a given CC set. The network configures the WTRU such that it monitors, (e.g., makes measurements on), neighbor cells/sites in supported CCs to move the WTRU onto a CC that maintains the delivered service quality in support of WTRU mobility. The periodic measurements or measurement events (1× and 2×) may provide sufficient information to the network to select the appropriate CC that may be used to transmit data to a particular WTRU for each CC that may be used, and when such CC-specific (inter-site) handover (CSHO) occurs.

In certain wireless communication systems, measurement events (1× and 2×) may be applicable for a WTRU configured with CA. These measurement events may be able to identify an individual CC for inclusion in a handover.

When data is sent to a WTRU from multiple sites, the WTRU data may be present at multiple sites. Generally, this creates additional strain on the backhaul if done in the same fashion as for coordinated multi-point (CoMP) transmission, where multiple transmission points/sites coordinate their transmissions. This coordination may take several different forms such as coordination in scheduling, jointly transmitting data to a WTRU, and the like. In joint transmission, a complete copy of WTRU data may be made available at each site participating in CoMP transmissions. The architecture of multiple CCs supporting one evolved packet system (EPS) radio access bearer (RAB) may be maintained by a radio access network through medium access control (MAC) multiplexing and de-multiplexing. In this approach, data may be received at a serving eNB, and then copied and forwarded to all cooperating CCs/eNBs. This approximately doubles the backhaul loads per WTRU participating in CoMP joint transmissions involving two sites.

The problem of cell-edge degradation due to interference limitations from neighboring cells in a frequency reuse 1 deployment may be alleviated by: 1) manipulating the locations of the cell-edges in each CC in the system; and/or 2) allowing the WTRU to receive data from multiple sites, (e.g., data may be received from Site A on carrier 1 and from Site B on carrier 2). In this way, the WTRU may be assigned to the site that provides the best throughput, (or other measure), for each CC that is in full aggregation of CCs, thereby creating the "fuzzy cell" concept where the notion of cell-edge does not apply as in a traditional cellular setting. As the WTRU is capable of receiving data on all CCs, a frequency reuse of one may be maintained. The WTRU may receive data on each available CC. The locations of the transmitting sites of the data for the WTRU may not be co-located in the system.

The cell boundary may be determined in part by the ratio of the largest signal power from any site to the sum of the power in the other signals (interference) and noise received at a given location and in any CC. The signal and interference powers received may be determined in part by the pathloss, antenna gain, and transmit power from each cell to the WTRU location. The manipulation of the cell-edge locations may then be performed using several different techniques.

In one embodiment, the WTRU may establish a connection with a plurality of sites via respective DLs. The sites may include at least one of a Node-B, an eNB, a remote radio head (RRH) associated with a base station, or one of several sector transmit antennas of a Node-B or an eNB. Each DL may include at least one DL CC that operates on a frequency that is the same or different than one or more of the other DL CCs. The sites may manipulate their transmit power for a particular DL CC operating frequency, such that the distance from a particular one of the sites to its cell boundary becomes larger by increasing its transmit power on the particular operating frequency, and the distance from at least one of the other sites to its respective cell boundary becomes smaller by decreasing its transmit power on the particular operating frequency. Thus, a coverage overlap between different CC frequencies is created while maintaining a frequency reuse pattern of one.

Figure 4:
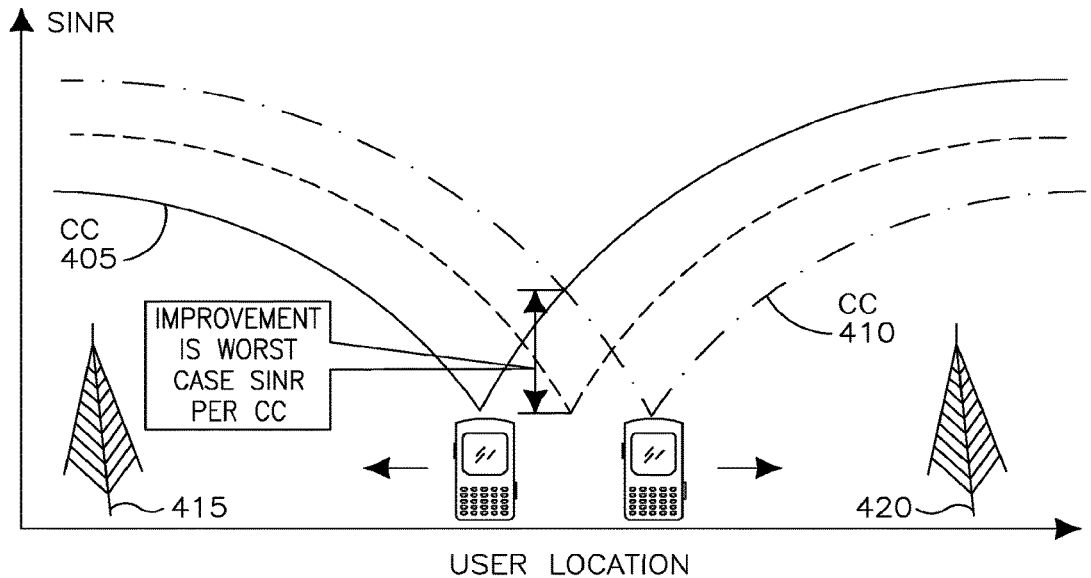
FIG. 4 shows use of CCs to improve a WTRU received signal-to-interference plus noise ratio (SINR) at a wireless communication system cell boundary.

To illustrate this point, FIG. 4 shows the SINR of each of two DL CCs 405 and 410 at each site. At each site 415 and 420, one CC is transmitted at a higher power than the other. Each of these CCs 405 and 410 may be considered a cell of its own with a different carrier frequency and potentially different coverage areas. The different coverage areas may result from differences in propagation conditions. However, certain system parameters may also be changed to intentionally change the DL coverage, such as transmit power, HO thresholds, sector antenna direction, and the like. This creates the opportunity for using CC to mitigate the DL cell-edge problem. For example, the coverage area may be intentionally adjusted for different DL CCs so that there may not be a point in the system at which a WTRU may find itself at the cell-edge of every DL CC it is attached to. Thus, the WTRU may not be at the cell-edge in both the carrier frequencies, (e.g., when the WTRU is at the cell-edge in the one carrier, it may still have satisfactory performance in the other carrier, and when the WTRU is located near the midpoint between two eNBs, the carrier SINR may still be better than the SINR of the single carrier system).

Additionally, the sector antenna patterns may be adjusted, (e.g., beamwidth, broadside angle, or other beam pattern shaping), so that transmit power density at different angles is controlled. The cell-edge locations may thus be manipulated by antenna patterns in a similar fashion as when the total transmit power was adjusted, except that now there is an angular component to affect on the location of the cell-edges, (i.e., changing the total power may change the power density in all departure angles by the same amount, whereas changing the antenna patterns may selectively change the transmit power density at different departure angles).

Figure 5:
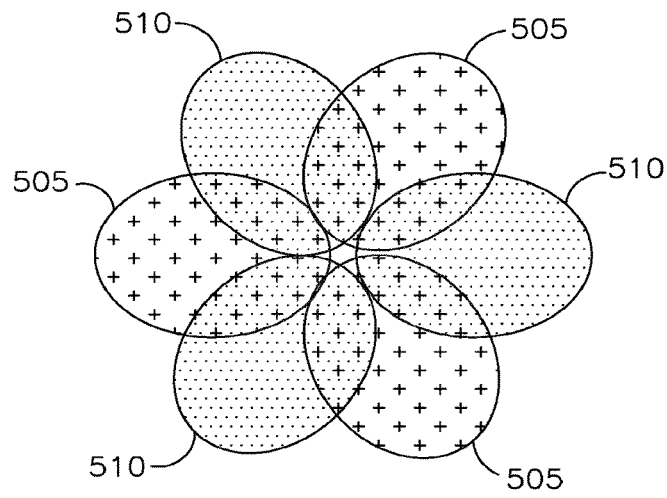
FIG. 5 is a conceptual illustration of rotation of sector antennas in one CC frequency.

For example, in a system with two carriers, where each site uses three sector antennas for each carrier frequency, a 3-sector pattern having 120 degrees per sector may be maintained within each carrier frequency, but one set of sector antennas may be rotated relative to the other. As shown in FIG. 5, the ellipses 505 may indicate sectors in the frequency of CC 405 in FIG. 4, and the ellipses 510 may indicate sectors in the frequency of CC 410 in FIG. 4. In this way, the center of the sector beam in one CC frequency may be placed directly on top of the sector cell-edge in the other CC frequency. If the WTRU is able to connect to two CCs, it may effectively eliminate the perceived cell-edge in a substantial part of the system.

Among the CC in the aggregation, the cell-edge locations may be configured to have large separations, (i.e., the cell-edge locations in one CC may be geographically separated from the cell-edge locations in at least one or more of the other CCs in the aggregation).

For example, in a cellular system that supports CA with multiple CCs, each site (eNB) may support all available CCs, whereby different CCs may use different transmit powers, as well as antenna patterns, so that the corresponding coverage may also be different per CC, (i.e., the cell-boundaries across all CCs may not be co-located). In a simple scenario with only two CCs, site numbers {1, 2, 3, . . . } may be assigned. For CC1, a power usage pattern may be defined where all even numbered sites transmit at power P1 and all odd numbered sites transmit at power P2. For CC2, a power usage pattern may be defined where all even numbered sites transmit at power P3 and all odd numbered sites transmit at power P4. Antenna usage patterns may also be defined. For CC1, an antenna usage pattern may be defined where all even numbered sites transmit with pattern A1 and all odd numbered sites transmit with pattern A2. For CC2, an antenna usage pattern may be defined where all even numbered sites transmit with pattern A3 and all odd numbered sites transmit with pattern A4. In this example, for even numbered sites, antenna gain may be larger pointing North in CC1 and pointing East in CC2, while for odd numbered sites, antenna gain may be larger pointing South in CC1 and pointing West in CC2. The set of CCs used by a particular WTRU may originate from different transmission sites or cells. For example, if there are N CCs in the full aggregated bandwidth, then for each of the N CCs, the WTRU may be assigned to receive data from the transmission point that has the best signal quality, (e.g., signal-to-interference ratio (SIR)) for that CC frequency). Since different CCs may have different power usage patterns and different antenna usage patterns, the assigned CCs may originate from multiple transmission sites, (e.g., CC1 and CC2 from Site A, CC3 from Site B, and CC4 from site C).

Several scenarios have been defined below to aid in the understanding of a CC cooperation network. These deployment scenarios are by no means exhaustive, and the scenarios presented here are representative scenarios only. One skilled in the art may appreciate and understand how to expand on these scenarios.

The following nomenclature will be used: DL carrier frequency dlF1, dlF2 . . . dlFn; UL carrier frequency ulF1, ulF2 . . . ulFn; DL cooperative CCs DL-CCC1, DL-CCC2 . . . DL-CCCn; UL CCs UL-CC1, UL-CC2 . . . UL-CCn; and sites S1, S2 . . . Sn.

Scenario 1: DL CCCs; DL-CCC1 from site S1 (DL-CCC1-S1), and DL-CCC2 (reduced power) from site S2 (DL-CCC2-S2) on dlF1; DL-CCC3-S1 (reduced power) and DL-CCC4-S2 on dlF2; and UL CCs on ulF1, namely UL-CC1-S1 and UL-CC2-S2.

Scenario 2: DL CCCs; DL-CCC1-S1 and DL-CCC2-S2 (reduced power) on dlF1; DL-CCC3-S1 (reduced power) and DL-CCC4-S2 on dlF2; and UL CCs on ulF1, namely UL-CC1-S1 and no UL carrier from site S2.

Scenario 3: DL CCCs; DL-CCC1-S1 on dlF1 and no DL carrier from site 2; and UL CCs on ulF1, namely UL-CC1 from S2 and no UL carrier from S1.

Scenario 4: DL CCCs; DL-CCC1-S1 and DL-CCC2-S2 (reduced power) on dlF1; DL-CCC3-S1 (reduced power) and DL-CCC4-S2 on same DL carrier frequency dlF2; UL CCs on ulF1, namely UL-CC1-S1 and UL-CC2-S2.

Scenario 5: DL CCCs; DL-CCC1-S1 and DL-CCC2-S2 (reduced power) on dlF1; DL-CCC2-S1 (reduced power) and DL-CCC2-S2 on dlF2; UL CCs namely UL-CC1-S1 on ulF1 and UL-CC2-S2 on ulF2.

Scenario 6: DL CCCs; DL-CCC1-S1 and no DL carrier from site 2 on dlF1; and UL CCs on ulF1, namely UL-CC1-S1 and on ulF2 UL-CC2 from S2.

In order to efficiently support reception of data on CCs from multiple sites, a CC-specific handover (CSHO) mechanism may be implemented in addition to individual CC activation/deactivation and CC management. CSHO may also be implemented when a special cell has been changed. Alternatively, an individual CC activation or CC deactivation may be used instead of an RRC reconfiguration procedure. For example, as the WTRU moves about, it will encounter CC-specific cell edges at different locations. The quality (e.g., SINR) of only a subset of the CCs assigned to the WTRU will drop to a point that the transmitting site for that CC should be switched to another site to maintain a desired reception quality.

In order for the network to effectively support CSHO, mobility measurement configuration/reporting per individual CC may be required. For example, WTRU may be configured to report neighbor cells/sites in all CCs (or a subset of CCs) that are part of the candidate set of CCs involved in a CC cooperation network. This may be implemented via an explicit modification of a monitored neighbor cell list, or via an implicit handling of cells detected by the WTRU by adding an undesired cell to a black list, or a configuration of a measurement on a specific CC of a network to ensure selection of a CC in the CC cooperation network to maintain the delivered service quality in support of WTRU mobility. In this way, the network may have sufficient information to determine the appropriate site that may be used to transmit data to a particular WTRU for each CC that may be used, and determine when CSHO may occur. This scenario may be fundamentally different from the usual handover, in that the WTRU remains in continuous contact with all sites, except for those being handed over to a new site, (if the WTRU does not already have a connection to it via a different CC), or when all of the CC connections from a site to the WTRU is terminated. Furthermore, the WTRU may remain in continuous connection with at least one site at all times, (i.e., the handover may be seamless).

Measurements performed on each CC may be scheduled, or triggers set up, such that the measurement overhead to support CSHO may be reduced based on the time when a CC-specific inter-site handover is beneficial in one CC, as well as when CSHO to another CC is not likely to be beneficial. Therefore, a method to define measurements independently on each CC may be defined so that measurements may be performed and signaled when they may actually be needed to support a CSHO. For example, when the SINR in a particular CC drops below a threshold, (or the particular CC is otherwise determined to be a candidate for CSHO), a measurement to support the CSHO only in the particular CC is performed and reported to a network, and measurements in the other CCs may not be triggered unless they also are candidates for CSHO. CSHO in which a new site is not being added may already be connected to the site which is the target of the handover.

In a CC cooperation network, instead of copying data to a multi-site as described by CoMP joint transmission, the data flow may be split so that complete copies of the WTRU's data is not sent to all of the sites involved in the CC cooperation transmission. For example, the data flow may be split before reaching any of the sites, such that only the data ultimately transmitted from a particular site is present at that site. Data transmitted from Site A may not need to be present at any site other than Site A. This potentially yields the most efficient solution to the data flow from a backhaul bottleneck point of view.

Alternatively, a full copy of the WTRU's data sent to a particular site, (i.e., an anchor site, camping site, primary site, and the like), and then the particular site may only send a portion of the data to the remaining sites that will transmit data to the WTRU. For example, a complete data flow is sent to Site A. From Site A, a portion of the data is sent to Site B. Site B transmits all such data to the WTRU and Site A transmits only the portion of data not previously sent to Site B. Site A may be chosen to be the site that will transmit the most data to minimize the total backhaul load. CoMP joint transmission techniques may also be used on the carrier used by Site B, since both sites may have this data.

The CC cooperation concept may be a possible low cost alternative to CoMP. However, they both may be deployed together and benefit from certain synergies. Depending on the suitability of CoMP, such techniques may be applied within one or more CCs. For example, if a WTRU is connected to two sites using different CCs, (Site 1 for CC1 and Site 2 for CC2), and if Site 1 is the primary camping site, the DL data from Site 2 may be split from Site 1. If the signal on CC2 from Site 2 is a candidate for CoMP techniques, CoMP may be employed with no increase in backhaul loads, (e.g., CC2 from Site 1 may be used to improve the reliability of the data transmission from Site 2 under a CoMP framework). If the CC cooperation takes place between Site 1 and Site 2, there is no need to copy the data from Site 2 to Site 1 again, since that data was originally forwarded from Site 1. If the CC cooperation takes place between Site 2 and one or more sites other than Site 1, (e.g., Site 3), then the data may be directly forwarded from Site 1 to Sites 2 and 3, or the data may be forwarded from Site 2 to Site 3 under a CoMP framework.

While the CC cooperation network configuration may be deployed independent of CoMP, the CoMP set selection, (either the measurement set or the cooperating set, and the like), decisions may be influenced by the CCC set, on a condition that the camping site already has a full WTRU data set. An additional input to a CoMP set determining algorithm may be defined to permit CoMP set decisions to be performed with the knowledge of the CCC configuration. For example, CC1 may be determined to be a CoMP candidate, and Sites 2 and 3 may both be satisfactory candidates to participate in CoMP transmissions. The choice of adding Site 2 or Site 3 to the CoMP set may normally not consider the CCC configuration, and either site may be chosen. However, if Site 3 is known to have a copy of the WTRU's data that may be part of a CoMP joint transmission, it may be chosen rather than Site 2. By creating the interface from the CCC configuration to the CoMP set determination algorithm, a better selection may be made.

The configuration of a network with the CCC feature may be performed and adaptively changed by exchanging certain information among the cooperating sites. By exchanging such information as the number and bandwidth of CCs, transmission power levels on the CCs, antenna patterns used in the CCs, system load on each CC, and the like, the cooperating sites may try to adjust the transmission parameters. In one embodiment, the transmission parameters may be determined in a central controller after collecting all possible information from the cooperating transmission points. The central controller may be responsible for the configuration of the transmission parameters of a cluster of transmission points. Alternatively, the transmission parameters may be autonomously determined by the transmission points by using the information exchanged among these points. In this case, the decision processes used in the sites may go through several iterations until a stable set of parameters have been determined in each site. The WTRUs may need to feed back information to the serving transmission points, (e.g., the level of interference created by a neighbor transmission point on a CC, path losses and/or level of received power from the transmission points on each CC, and the like).

As an example, some sites may employ a reuse factor of 3, (i.e., only transmit on one of the CCs of 1-3); while some sites may have a reuse factor of one, (i.e., transmit on all three CCs). The reuse scheme may be dynamic so that higher order schemes may be employed when traffic is light, or when there is a large number of high QoS users, such that when demand increases, the reuse factor may be reduced. This feature may reduce the power consumption of base stations when the system load requirement is not high by turning off power on some of the CCs. As another example, one transmission site may report the excessive interference level its WTRUs experience in one of the CCs, and may have the neighboring cells reduce the transmission power on that CC.

Semi-static inter-CC interference coordination strategies may be required to allow adaptive update and configuration, and may include an extension of the standardized relative narrowband transmit power (RNTP) indicator, high interference indicator (HIT) and overhead indicator (OI) for each CC. The RNTP indicator may indicate the maximum DL transmit power per physical resource block (PRB). Similarly, for the UL, HII and OI may inform neighboring eNBs of a UL usage plan and interference plus noise measurements, respectively. CCCs may be dynamically re-provisioned and/or added/removed to cover holes or mitigate interference based on these and other measurements and indicators.

Other messages exchanged among the transmission sites may include measurements, (e.g., number of active WTRUs and the like), allow adaptive updates for load-balancing across CCs and switch on and off those CCs that are not needed for traffic for interference reduction purposes, (in particular if some CCs are used in home-eNBs). Mobility robustness improvements may be enabled by tracking number of radio link failures (RLFs) and HOs, power restrictions or preferred PRBs and the like.

Another factor that may affect performance is a random access channel (RACH) configuration, which may affect RACH collision probability, and hence making this a significant factor in call setup delays, data resuming delays and handover delays. This also may affect the call setup success rate and handover success rate. UL CC assignment for WTRUs in the range of a CCC may not be identical to DL CCC, and adaptive CCC configuration and UL association may need to consider RACH load, UL interference, and impact to RACH performance/usage in each cell.

Under a fuzzy cell context, in order to create a cell deployment with a non-uniform power across different CCs and sites, the DL EPRE per CC and per site may be varied in accordance with the surrounding environments. In order to derive a DL reference-signal EPRE, and PDSCH EPRE, the WTRU may determine the DL Reference-signal-power, as well as $\rho_A$ and $\rho_B$. As a consequence, to support a fuzzy cell, it may be required that these three parameters are provided per CC per site by the network.

Before a fuzzy cell WTRU establishes connections to multiple eNBs for DL data transmission, the WTRU may receive power control information from the SIB2 of a DL-SCH channel when an RRC connection is established, and from a mobility control information IE carried in a RRC reconfiguration message in a connection mode. During and after the WTRU sets up multi-eNB connections, it may continue to rely on mobility control information transmitted as a part of the RRC reconfiguration message to obtain multiple eNB and CC power control information.

The DL power control parameters, along with associated cell information about one eNB, may either be transmitted via the eNB's RRC reconfiguration message, or it may be forwarded via X2 signaling to another eNB, and then signaled to the WTRU. In the latter case, the configuration information may designate a maximum number of sites that a WTRU may be connected to at any given time.

To improve system efficiency and operability, a cross-carrier scheduling mode may be implemented, whereby a PDCCH may be located in the first n OFDM symbols with n less than or equal to four (4), and with the earliest data transmission start being at the same OFDM symbol as the control signaling ends. This may enable support for micro-sleep and reduce buffering and latency. The physical control format indicator channel (PCFICH) may be used by the eNB to inform the WTRU about the number of OFDM symbols (1, 2, 3, or 4) used for the PDCCH in a sub-frame. This channel may comprise 32 bits, which may be cell-specific scrambled prior to modulation and mapping.

The concept of anchor carrier will now be presented in a fuzzy cell context. An anchor carrier may be defined per site.

If a WTRU is connected to more than one site, the WTRU may have multiple anchor carriers defined at any given instant. The definition of anchor carrier may be in addition to a primary CC (PCC). One of the anchor carriers may be the PCC for the WTRU. All UL control channel feedback on a physical UL control channel (PUCCH) may only be defined for the UL anchor carrier for that site.

In a fuzzy cell configuration, an anchor carrier may denote the UL CC which carries all control channel feedback on the PUCCH for that site. All other secondary cells from that site may only support a shared data channel or physical UL shared channel (PUSCH). Thus, a difference between the anchor carrier definition and the PCC may be that there is only one PCC where there may be as many anchor carriers as there are sites that the WTRU may be connected to. It may not always be required to define an anchor carrier per site, especially in scenarios where there is no UL CCC defined for that site. For the site where a PCC is defined, an anchor carrier may be the same CCC as the PCC.

In one embodiment for fuzzy context, a WTRU operating in a cross-carrier scheduling mode may read a control format indicator (CFI) via a PCFICH on the anchor carrier for that site. In addition, to indicate the starting position of PDSCH reception for cross-scheduled CCC, RRC signalling may be used to configure CFI for cross-scheduled CCC originating from that site. The WTRU may read the CFI from a dedicated RRC signaling that is transmitted in the anchor carrier and determine the starting position of PDSCH reception in the corresponding cross scheduled CCC.

In another embodiment for fuzzy context, a WTRU operating in cross-carrier scheduling mode may read the CFI via a PCFICH on the primary CC (PCC). Cross-scheduling information for all CCCs from one or more eNBs may be sent to the eNB where the PCC is defined. To indicate the starting position of PDSCH reception for all cross-scheduled CCCs, (including those CCCs not originating from this eNB), RRC signaling may be used to configure CFI for all cross-scheduled CCCs. The WTRU may read CFI from dedicated RRC signalling that may be transmitted in the anchor carrier, and determine the starting position of PDSCH reception in the corresponding cross-scheduled CCCs.

Since all CCs may originate from the same eNB, introducing only a CI field may be sufficient in option 1b to indicate which CC the grant may be for. In a fuzzy cell, some of the WTRU's data may originate from one eNB, while other data may originate from other eNBs. Since the WTRU may know which eNB it is connected to for a particular CC, and the WTRU may not connect to more than one eNB simultaneously with that CC in a non-CoMP mode, (even in CoMP mode, there may be only one grant for one CoMP set), the CI field may be sufficient in the fuzzy cell by only indicating which CC the grant may be for, but the CI field may have to be transmitted from each anchor carrier of the WTRU, as opposed to a PCC.

This type of cross-eNB grant transmission may include the transmission of a grant from one eNB via X2 signaling to another eNB, and may further include the transmission by that eNB's PDCCH channel. In some deployments, transmission of the grants from one eNB to another eNB may not occur due to the delay incurred over an X2 interface. Thus, DL grants may be transmitted via the PDCCH channels from the same eNB as the corresponding data channels on the corresponding anchor carrier. When option 1b is implemented in a fuzzy cell context, the PDCCHs on a given carrier with separate coding may be used to schedule resources on multiple carriers from the same eNB anchor carrier, if cross-eNB grant transmission is prohibited due to a large X2 delay.

In summary, a fuzzy cell capable WTRU may have at least one PDCCH per eNB from which it may receive data, and the actual configuration may depend on the CC types and system setup. For example, if a WTRU is connected to eNB 1 with CC1 and CC2, eNB 2 with CC3 and CC4, and the anchor carrier from eNB1 is CC1, and the anchor carrier from eNB2 is CC3, the following configurations for DL granting may be used.

If all of the CCs are backward compatible, the WTRU may be configured to use option 1a, with each CC containing its own PDCCH for grant transmission.

If all of the CCs are non-compatible, the WTRU may be configured to use option 1b, with one PDCCH (with separate coding) on its anchor carrier CC1 from eNB1 to carry grants for CC1 and CC2, and one PDCCH from eNB 2 on its anchor carrier CC3 to carry grants for CC3 and CC4.

Alternatively, a hybrid scheme may be used: option 1a for eNB1 and option 1b for eNB2, and the like, or vice versa, depending on the CC types.

In another embodiment, if an X2 interface delay between different eNBs is very small, grants from one eNB may be forwarded via the X2 interface to another eNB, and then may be transmitted via that eNB's PDCCH channel using a PCC with option 1b by using a CI field. This may provide for more efficient scheduling in the network, along with better interference management opportunities. To achieve a low X2 interface delay, a new GPRS tunneling protocol (GTP) tunnel may be created on an X2 interface for this purpose. An X2 interface for a user plane may use a GTP, whereas an X2 interface for a control plane may use a stream control transmission protocol (SCTP). In some implementations, the SCTP may be slower than the GTP, even though the SCTP may be a connection oriented protocol that transports data in independent streams, (as compared to TCP). It may be advantageous to use an X2 GTP tunnel in such scenarios. Any proprietary mechanisms may also be used to reduce latency on an eNB-eNB interface. Furthermore, since the WTRU may know which eNB a particular CC is connected to, it may not be necessary to specify the site information in a grant transmission.

A WTRU may monitor a set of PDCCH candidates from the same site for control information in every non-DRX subframe, where monitoring may imply an attempt to decode each of the PDCCHs in the set according to all of the monitored DCI formats. In a fuzzy cell context, a WTRU may be required to monitor multiple sets of PDCCH candidates for control information in every non-DRX subframe, (i.e., one set for each site the WTRU is going to receive data from). A DL PDCCH CC monitoring set may be extended across multiple sites, or the WTRU may maintain two PDCCH CC monitoring sets.

For WTRU-specific search space, a WTRU may monitor DCI 0/1A and a DCI which may be semi-statically configured via RRC signaling, depending on the transmission mode. For a fuzzy cell WTRU which may be connected to multiple sites, the DCI formats in WTRU-specific search space from one site may either be directly signaled via RRC signaling from that site, or the information may initially be forwarded to the main serving site through X2 signaling, and then transmitted through the main serving site's RRC signaling.

The deployment of the CCC concept in the UL signaling may occur, since there may be no equivalent CCC concept in the UL. Specifically, the best UL CC to use in terms of quality of reception, (or required power to achieve particular UL quality), may not be influenced by the CCC configuration. Thus, the site that may best receive the UL control messages, (ACK/NACK, CQI, and the like), from the WTRU may be different than the site from which the WTRU received the corresponding DL data. For ACK/NACK signals. For example, the ACK/NACK may be signaled to the site that has the best pathloss, (or long term pathloss), with a UL power control appropriate for that site. The receiving site may then forward the ACK/NACK to the site transmitting the DL data so that retransmission may be scheduled. Alternatively, the UL Tx power may be adjusted so that the UL ACK/NACK may be monitored by the same site providing the DL data.

In a scenario where the WTRU is connected with multiple eNBs (or sites) with one or more UL CCs to each site, the corresponding UL anchor carrier associated with the eNB may be used for sending UL control information (UCI) to each site. In another embodiment, all UCI may be sent using the PCC, and then relevant control information for each eNB may be forwarded from the eNB servicing the UL PCC using the X2 interface. The UL control information may be forwarded on an X2 interface based on the delay incurred over the X2 interface, and may be specific to X2 interface implementations.

In situations where an X2 interface delay is tolerable, the WTRU may be assigned a UL CC to only one site. In such a scenario, all UCI may be sent on this UL CC and may be forwarded to the other site using an X2 interface. Furthermore, it may be desirable to use a GTP over the X2 interface, as opposed to an SCTP, or vice-versa, depending on implementations of the X2 interface.

Similar solutions may be applied to CQI-type signals. Alternatively, the CQI reporting schedules between sites participating in a CCC may be coordinated so that CQI transmission from a WTRU to multiple sites may occur on the same radio resources. Furthermore, the CQI information for the multiple sites, (i.e., the multiple DL CCs), may be coded into a single message monitored by both sites. Thus, both sites may have increased SINR because the inter-cell interference for the CQI report may be reduced, and both sites may monitor the same message from a single WTRU, rather than having multiple UL messages, (possibly from different WTRUs), being transmitted in the same radio resources to multiple sites. Since the WTRU may not send a separate message to each site, these separate messages may not interfere with each other. Furthermore, since both sites may know each others CQI reports, any exchange of CQI messages between the sites using backhaul may not be needed, (e.g., to help manage data flow splitting).

UCI may be piggybacked when a simultaneous configuration of a PUCCH and PUSCH is not implemented. In one embodiment, UCI may be transmitted on each anchor carrier if the WTRU has a PUSCH transmission configured on the anchor carrier(s). In another embodiment, if an X2 interface delay is acceptable, all UCI may be sent on a UL PCC. In case the WTRU has a PUSCH transmission on a secondary cell that is not available on an anchor carrier or PCC, the WTRU may transmit the UCI to each site on their corresponding secondary CCs (SCCs).

Pairing or association between UL and DL carriers may be provided by the network as part of broadcast information or dedicated RRC signaling. If corresponding UL carrier frequency information is absent, such information may be derived from a default Tx channel, (carrier center frequency), to a receive (Rx) channel, (carrier center frequency), separation.

Some aspects related to UL signaling, UL power control and UL grants are explained below using different scenarios, whereby the DL carrier frequency is dlF1, dlF2 . . . dlFn, the UL carrier frequency is ulF1, ulF2 . . . ulFn, the DL CCC is dlCCC1, dlCCC2 . . . dlCCCn, the UL CC is ulCC1, ulCC2 . . . ulCCn, and the site is S1, S2 . . . Sn.

If not particularly specified in RRC signaling, the default pairing of a DL CC and a UL CC, which may be equivalent to the pairing of a DL carrier frequency and a UL frequency, may be based on the duplex distance, (i.e., Tx-Rx frequency separation for each operative frequency band).

The network may have the ability to specifically signal a pairing of a DL CC and a UL CC in accordance with a different rule, whereby the difference between the DL CC and the UL CC is not the duplex distance. Since the duplex filter may be built with the specification of the duplex distance, a frequency distance between the DL and UL CCs of one pair may not cause filtering performance degradation.

The pairing of a DL CC and a UL CC may dictate the DL and UL association of a range of operations. For example, a pairing of dlCCC1 and ulCC1 may imply that the UL grant of ulCC1 may be transmitted in dlCCC1, an ACK/NACK associated with a hybrid automatic repeat request (HARQ) transmitted on dlCCC1 may be carried on ulCC1, and the like.

FIGS. 6-12 show various operation scenarios for a WTRU that may communicate with two different sites (eNBs). Details presented below that are associated with FIG. 6 may apply to all other scenarios unless alternate details are explicitly mentioned in each of the respective scenarios.

Figure 6:
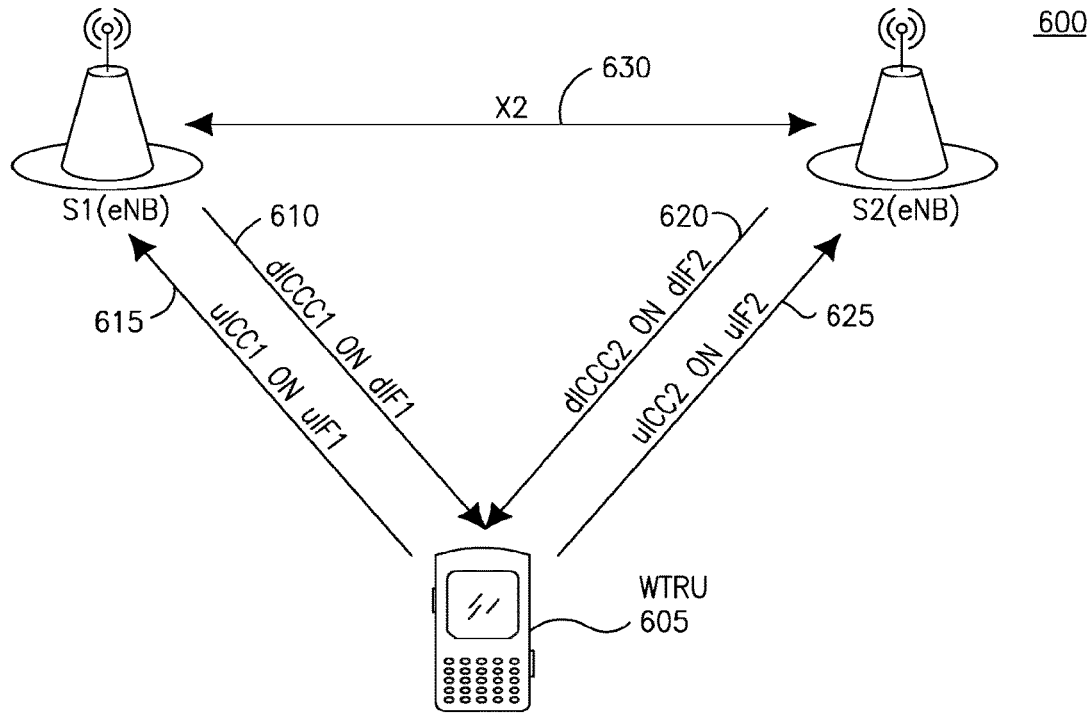
FIGS. 6-12 show various operation scenarios for a WTRU communicating with two different sites (eNBs)

FIG. 6 shows a wireless communication system 600 including a WTRU 605 and two Sites (eNBs) S1 and S2. The WTRU 605 may be connected with site S1 via a DL 610 (dlCCC1 on dlF1), and via a UL 615 (ulCC1 on ulF1). The same WTRU 605 may be connected with Site S2 via a DL 620 (dlCCC2 on dlF2), and via a UL 625 (ulCC2 on ulF2). An X2 interface 630 may allow Sites S1 and S2 to communicate with each other.

In the scenario shown in FIG. 6, the DL 610 may carry the pCell, and the UL 615 may be the primary UL CC where UCI may be transmitted via a PUCCH separately. In one embodiment, the DL 620 may be configured as the sCell and the UL 625 may only carry PUSCH where UCI is piggybacked in a PUSCH.

In this UCI piggyback scenario, when simultaneous PUCCH and PUSCH are not configured, the UCI, (e.g., ACK/NACK and channel state information (CSI)), may be transmitted in a single UL carrier selected according to the following rules. When the WTRU 605 has a PUSCH transmission on the primary cell, the UCI may be transmitted over the primary cell. When the WTRU 605 has a PUSCH transmission on one or more secondary cells, but not on the primary cell, the UCI may be transmitted over one secondary cell.

In one alternative embodiment, UCI for the DL 620 may be sent over the X2 interface 630. The decision of whether to send UCI either piggybacked on an sCell PUSCH, or to send it over the X2 interface 630, may depend on the implementation and may be influenced by several factors, such as delay over the X2 interface 630, whether cross-carrier scheduling may be performed in a pCell for an sCell to take advantage of better inter-cell interference management, and the like.

Another option may be to employ the anchor carrier that transmits PUCCH to each site. The UL 615 may be the anchor carrier for Site S1 and the UL 625 may be the anchor carrier for Site S2. Thus, the UCI intended for Sites S1 and S2 may be sent on its respective anchor carrier.

The PUSCH transmission power may be set as follows:

$$P=\min[P_{MAX}, 10\cdot\log_{10}M+P_{0\_PUSCH}+\alpha\cdot PL+\Delta_{MCS}+f(\Delta_i)], \quad \text{Equation (1)}$$

where $P_{MAX}$ is the maximum WTRU power which depends on the WTRU class, M is the number of allocated physical resource blocks (PRBs), PL is the WTRU path loss derived at the WTRU 605 based on RSRP measurement and signaled RS eNB transmission power, $\Delta_{MCS}$ is a modulation and coding scheme (MCS)-dependent power offset set by the eNB, $P_{0\_PUSCH}$ is a WTRU-specific parameter, (partially broadcasted and partially signaled using RRC), $\alpha$ is cell-specific parameter, (broadcasted on a broadcast channel (BCH)), $\Delta_i$ are closed loop power control (PC) commands signaled from the eNB (S1, S2) to the WTRU 605, and the function f( ) indicates whether closed loop commands are relative accumulative or absolute. f( ) is signaled to the WTRU 605 via higher layers.

The parameter PL is the path loss estimate calculated in the WTRU 605 as PL=referenceSignalPower−higher layer filtered RSRP. When multiple UL CCs are used for UL transmission, a path loss estimate for each UL CC may be used. In one embodiment, the path loss $PL_0$ on one of the DL CCs, for example, a CC that was defined as the anchor may be estimated. For a given UL CC k, the path loss estimate may be computed as:

$$PL(k)=PL_0+PL\_offset(k), \quad \text{Equation (2)}$$

where PL_offset(k) may be signaled by the eNB. The offset value may be used to offset the path loss difference due to the frequency separation between different UL CCs. A linear combination of the path losses estimated on several or all of the DL CCs may be used as $PL_0$.

The UL power control mechanism may depend on the power amplifier (PA) configuration of the WTRU 605, the number of UL CCs, and whether there is a single PA used for all UL CCs, or possibly one PA for each CC, or one PA for several CCs, the association of the DL CCs and/or the transmitting sites to the UL CCs and determination of the open loop component of the UL power control, the signaling from the network to manage the closed loop component of the UL power control, and the differences of power control mechanisms for data and control transmission.

The association of the UL CCs to the sites may be such that all UL CCs may or may not be associated with one site. In another possible approach where the sites may cooperate, a UL CC may be associated to a "virtual" site.

With the fuzzy cell concept, transmission on different DL CCs may be generated on physically separated sites. The path losses from these sites (S1, S2) to the WTRU 605 may be significantly different. Therefore, a separate path loss may be estimated for each of the transmission sites. The path loss for a given transmission site may be estimated by using one of the DL CCs used by that site for transmission, for example, one that may have been defined as the anchor carrier for that transmission site. Alternatively, a linear combination of the path losses estimated on some or all of the DL CCs may be used by that site.

The path loss estimate used in the UL power control for a specific UL CC may depend on the configuration of UL CCs. In accordance with one embodiment, PL(k) may be used for the power control of a UL CC, and may be determined by the path loss estimate of the site with which the UL CC is associated. Specifically:

$$PL(k)=PL_0(i)+PL\_offset(k,i), \quad \text{Equation (3)}$$

where i denotes the site which the kth UL CC is associated with. The association of the UL CCs to different transmission sites may be used to coordinate UL interference and/or for load balancing purposes.

In the fuzzy cell concept, separate PDCCHs may be transmitted from transmission sites. Within the DL CCs used by a specific transmission site for transmission, a separate PDCCH per DL CC may be sent to schedule transmission resources on that carrier. Alternatively, a PDCCH transmitted on one DL CC may schedule resources on another DL CC with the use of a carrier indication field.

Similarly, an UL grant that allocates the resources for transmission on a specific UL CC may be transmitted by the transmission site which the UL CC is associated with. There may be an association with the UL CC to one of the DL CCs used for transmission by that site. This DL CC may be used to transmit the UL grant. The transmit power control (TPC) command may also be carried in the same component carrier as the UL grant. The ACK/NACK due to the UL transmission may be also carried on this DL CC.

In an alternative embodiment, the UL grant for a UL CC may be transmitted by a different site than the site which the UL CC is associated with. In this case, the UL grant may include a UL CC, (and transmission site), indication field to indicate to the WTRU 605 which UL carrier the resource allocation information may be for. The TPC command may also be carried similarly. In this case, the transmission sites may need to exchange information, such as CSI parameters, (including CQI/precoding matrix indicator (PMI)/rank indicator (RI) and the like), power control parameters (e.g., TPC) and the like, so that scheduling decisions may be implemented.

UL control data may include an ACK/NACK due to the DL transmission, channel state information (CSI) including CQI/PMI/RI, channel quantization information, and the like, which may be used for scheduling decisions, scheduling requests, and the like. UL control data may be carried in a UL control channel (PUCCH) or PUSCH.

For PUCCH transmission, the PUCCH may be mapped to one UL CC. This UL CC may be selected such that the path loss to the receiving site is the smallest among all possible sites/carriers. In this case, the PUCCH power control may be adjusted by using the parameters for this site, (e.g., the path loss, and the like). PUCCH information may be mapped to several UL CCs where each UL CC may be associated with a different transmission site. The PUCCH in one UL CC carries the control data for the corresponding transmission site. PUCCH power on a specific UL CC is adjusted such that PUCCH is reliably received at the corresponding transmission site.

In addition, UL power control associated with CA may be implemented using various parameters that are specific to the DLs 610 and 620, each having a defined maximum power. The total UL power may be also restricted by a maximum power related to the WTRU class. For the fuzzy cell concept, the pathloss used by UL power control may be derived based on the configuration from the network in terms of which of the DLs 610 and 620 to measure, whether to apply offset per DL, and the like.

The following UL power and grant related aspects may be applicable for the fuzzy cell concept. TPC in a UL grant may be applied to a UL CC for which the grant applies, (i.e., a TPC sent in a UL grant from the DL 610 may be applied to the UL 615 in site S1. With CIF based cross-carrier scheduling, the TPC field in the UL grants configured with CIF may control the power of the PUSCH and SRS transmissions in the UL CC that may not be linked with the DL CC in which the grant is transmitted. Thus, with cross-carrier scheduling in this scenario, the DL 610 may send TPC to regulate UL power of the UL 625 if necessary. However, given the cross-site configuration, any such joint-scheduling effort may require data exchange over the X2 interface 630. The benefit may be reducing overhead from signaling on the DL 620 as much as possible, and in utilizing the DL 620 for data use. In the case of the DL 620 being an extension CC where no PDCCH may be present, the cross-carrier UL power control may become necessary.

TPC in DL grant may be applied to a UL CC for which the ACK/NACK may be transmitted, (i.e., a TPC command sent in a DL grant from the DL 610 may be applied to the UL 615 in Site S1).

TPC in DCI format 3/3A may be applied to the UL CC using a combination of a TPC index in RRC signaling and TPC-PUSCH-radio network temporary identifier (RNTI). This configuration may be extended for cross-carrier UL power control TPC transmission using DCI 3/3A. A power headroom report (PHR) may include CC-specific reports for PUCCH/PUSCH. Since Type 2 PHR may only be valid for pCell, in this scenario, presuming the UL 615 is the primary cell (pCell) UL and the UL 625 is the secondary cell (sCell) UL, Type 1 PHR may be used for the UL 615 and Type 2 PHR may be used for the UL 625. Therefore, there may be instances that the WTRU 605 simultaneously transmits Type 1 and Type 2 PHRs.

Maximum power scaling may be conducted per channel with priority on PUCCH power followed by PUSCH including UCI and then PUSCH. In this scenario, a new priority may be introduced that is related to the site configuration. For example, instead of applying the priority based on the channel, the UL connected to one site may be scaled down, regardless of what channels are carried. This may be a simple radio frequency (RF) attenuation on one frequency in this scenario, instead of going through the scaling calculation in baseband. Timing advance may be sent from two sites based on the reception of the UL 615 at Site S1 and the reception of the UL 625 at Site S2.

Figure 7:
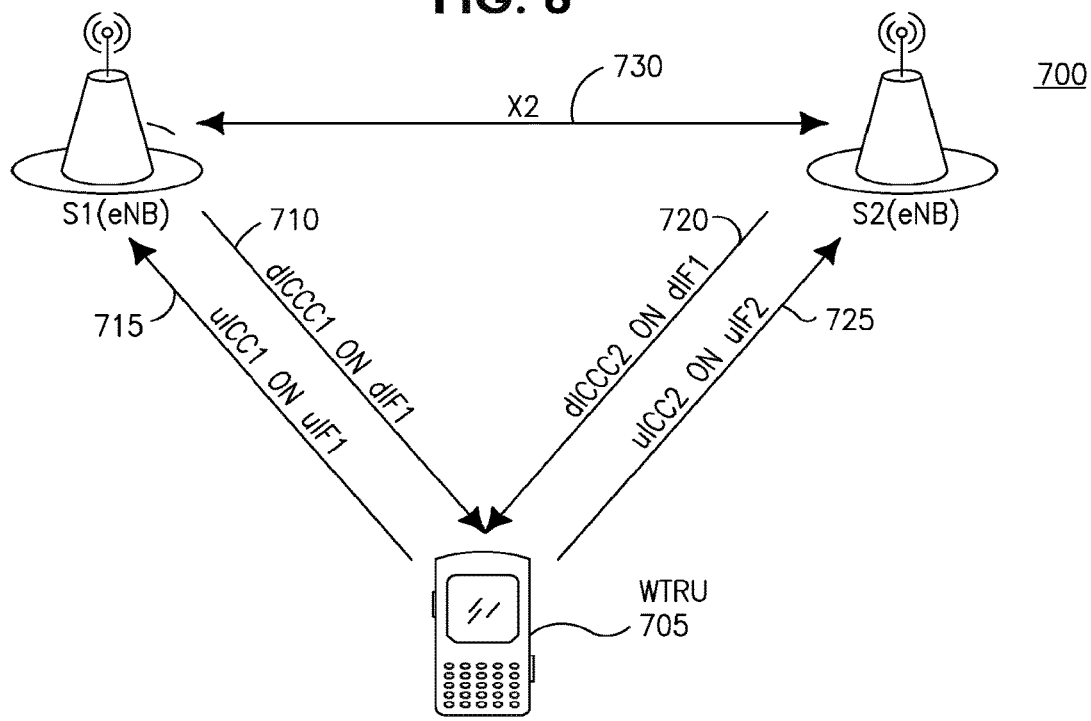

FIG. 7 shows a wireless communication system 700 including a WTRU 705 and two Sites (eNBs) S1 and S2. The WTRU 705 may be connected with Site S1 via a DL 710 (dlCCC1 on dlF1), and via a UL 715 (ulCC1 on ulF1). The same WTRU 705 may be connected with Site S2 via a DL 720 (dlCCC2 on dlF1), and via a UL 725 (ulCC2 on ulF2). An X2 interface 730 may allow sites S1 and S2 to communicate with each other.

In the scenario shown in FIG. 7, the difference between dlF1 and ulF2 may be less than the duplex distance. In all scenarios, a fuzzy cell configuration may implement a common scheduler that performs scheduling of resource of carriers belonging to different sites based on CSI reported with respect to each site and exchanged via the X2 interface 730 and consolidated at the common scheduler. In this scenario, as the DLs 710 and 720 are both at the same frequency, if both carry a PDCCH, despite the orthogonality afforded by a physical cell identifier (PCI) scrambled at bit level, the performance blind decoding of the PDCCH on the DL 710 and 720 may be degraded. Moreover, the common scheduler may insure that the RBs used for data transmission on the DL 710 may not be scheduled on the DL 720 to avoid interference. Unlike in system 700, the DLs 610 and 620 may operate on two different frequencies in the system 600 of FIG. 6. Except for this restriction, the scenario of FIG. 7 may be similar to the scenario of FIG. 6 in terms of its UL aspects.

Figure 8:
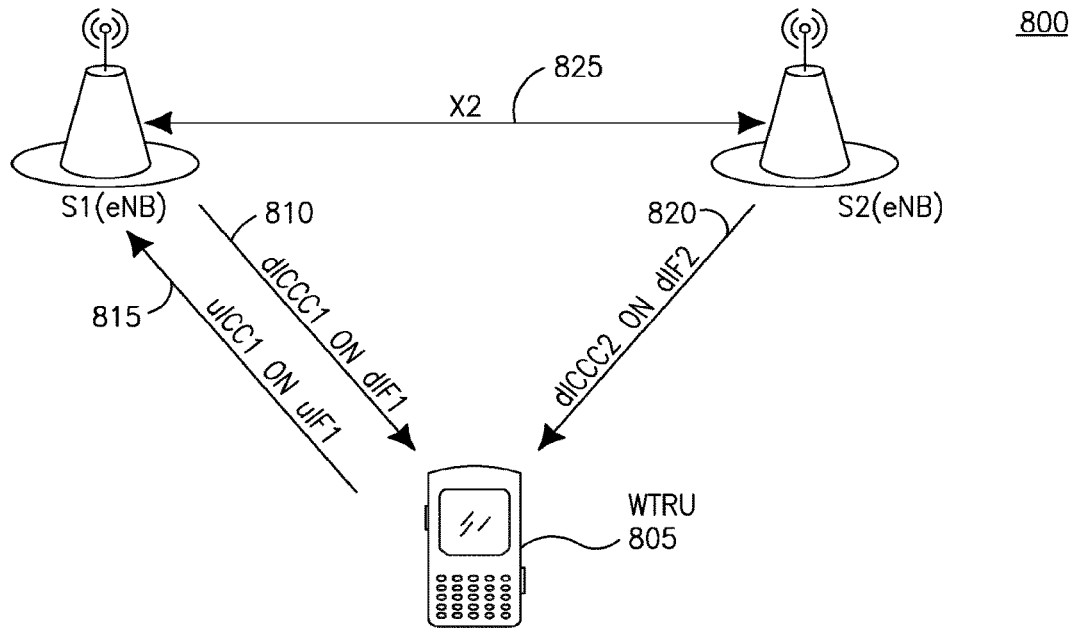

FIG. 8 shows a wireless communication system 800 including a WTRU 805 and two Sites (eNBs) S1 and S2. The WTRU 805 may be connected with Site S1 via a DL 810 (dlCCC1 on dlF1), and via a UL 815 (ulCC1 on ulF1). The same WTRU 805 may be connected with Site S2 via a DL 820 (dlCCC2 on dlF2), and has no associated UL CC. An X2 interface 825 may allow Sites S1 and S2 to communicate with each other.

All feedback and HARQ information corresponding to DL 820 may be multiplexed onto the UL 815, transmitted to Site S1 and subsequently forwarded to Site S2 via the X2 interface 820. Power control and timing advance may be regulated by Site S1 via the DL 810. The latency introduced by X2 interface information forwarding may not affect the HARQ/CSI time line, because the common scheduler is aware of in which sub-frame Site S2 may transmit a certain transport block (TB) in the DL 820, and instruct Site S1 to expect the associated ACK/NACK in the sub-frame that is four sub-frames later. Thus, the HARQ transmission on the DL 820 may initiate at Site S2 and terminate at Site S1. In the case of a NACK, Site S1 may inform Site S2 regarding the retransmission in sufficient time so that the WTRU 805 receives the retransmission exactly eight sub-frames later.

The multiplexing of ACK/NACK associated with both the DLs 810 and 820 onto the UL 815 may require additional signaling from Sites S1 to S2 in order for proper operation of the DL 820 over the X2 interface 825. The WTRU 805 may receive UL grants for the UL 815 from the DL 810. The common scheduler, (likely residing at site S1 in FIG. 8), may readily have CSI associated with both Sites S1 and S2, and may perform a common pool scheduling and apply cross-carrier scheduling in PDCCH using CIF for DL resource scheduling.

Figure 9:
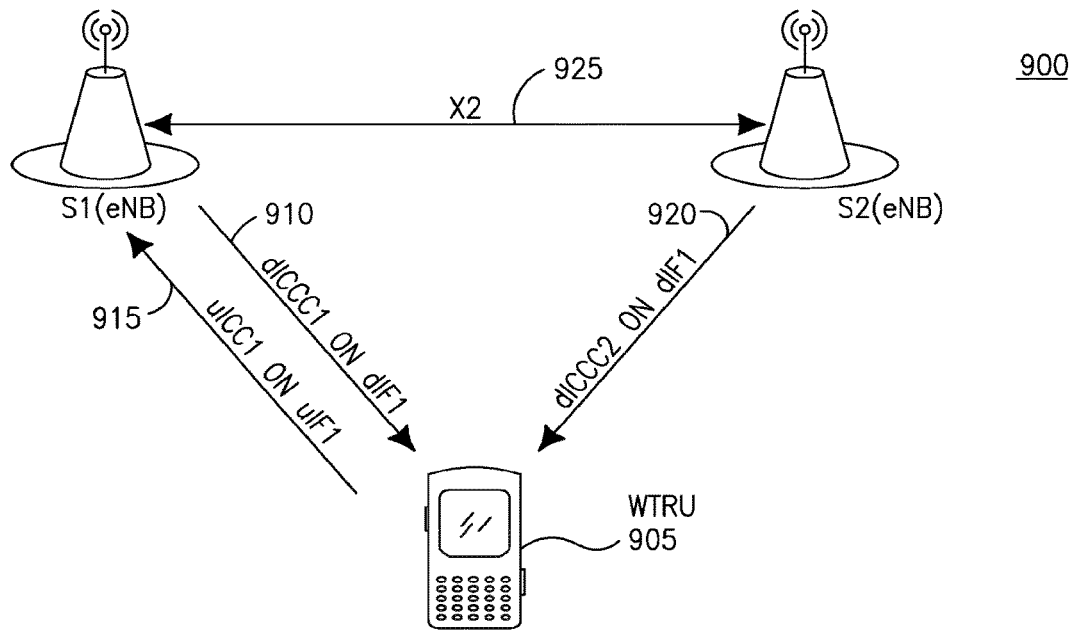

FIG. 9 shows a wireless communication system 900 including a WTRU 905 and two Sites (eNBs) S1 and S2. The WTRU 905 may be connected with Site S1 via a DL 910 (dlCCC1 on dlF1), and via a UL 915 (ulCC1 on ulF1). The same WTRU 905 may be connected with Site S2 via a DL 920 (dlCCC2 on dlF1), and may have no associated UL CC. An X2 interface 925 may allow Sites S1 and S2 to communicate with each other. This scenario may be similar to the system 800 of FIG. 8 in terms of UL configuration, and may be similar to the system 700 of FIG. 7 in terms of DL configuration.

Figure 10:
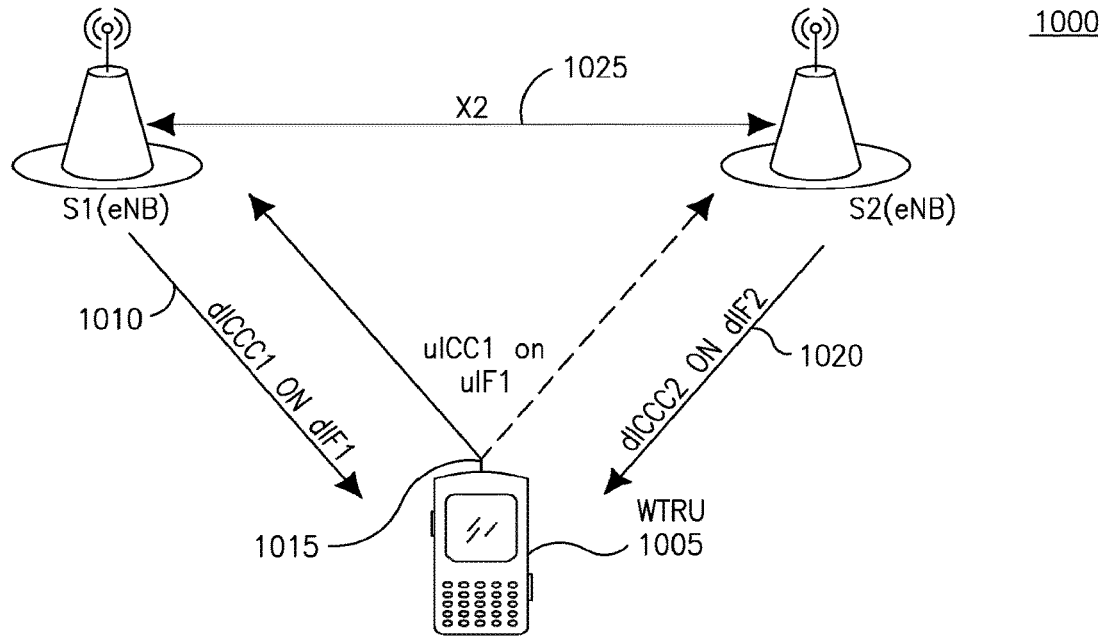

FIG. 10 shows a wireless communication system 1000 including a WTRU 1005 and two Sites (eNBs) S1 and S2. The WTRU 1005 may be connected with Site S1 via a DL 1010 (dlCCC1 on dlF1), and via a UL 1015 (ulCC1 on ulF1). The same WTRU 1005 may be connected with Site S2 via a DL 1020 (dlCCC2 on dlF2), and the UL 1015. An X2 interface 1025 may allow Sites S1 and S2 to communicate with each other.

All feedback and HARQ information corresponding to the DL 1020 may be multiplexed onto the UL 1015. Using the UL scheduling information provided by Sites S1 to S2 via the X2 interface 1025, Site S2 may demodulate and decode the UL 1015 accordingly. The Site S2 may have the ability to aperiodically trigger a sounding reference signal (SRS) for UL channel estimation as Site S1 does, and also may have the ability to schedule CSI information separately from Site S1. The common scheduler may need to coordinate the UL resource allocation between Sites S1 and S2.

In addition, two sets of power control and timing advance mechanisms may be employed at two sites intended for one WTRU, and either selectively or collectively this information may be evaluated and reconciled. For example, during the period where the Site S1 is subjected to a satisfactory UL SINR from the WTRU 1005, more RBs on the UL 1015 may be scheduled for the Site S1. This may selectively transmit to the Sites S1 or S2 in a different period mat equate to a type of time division multiplexing (TDM) applied to the UL 1015.

Furthermore, in the case of power control, typically the UL SINR at one site (eNB) may be taken into account, whereas in a fuzzy configuration, the common scheduler may look for a type of balance between UL SINR at the Site S1 and the SINR at the Site S2, and may generate one common set of TPC bits accordingly.

Due to the different propagation paths, the sub-frame of the UL 1015 may arrive at the Sites S1 and S2 at different time instances and, in turn, may lead to two different timing advance values TA1 and TA2. Depending on the difference between TA1 from S1 and TA2 from S2, the selective and collective approaches may be applied. The usage of the UL 1015 may be optimized to reach Sites S1 and S2 simultaneously or alternatively.

Figure 11:
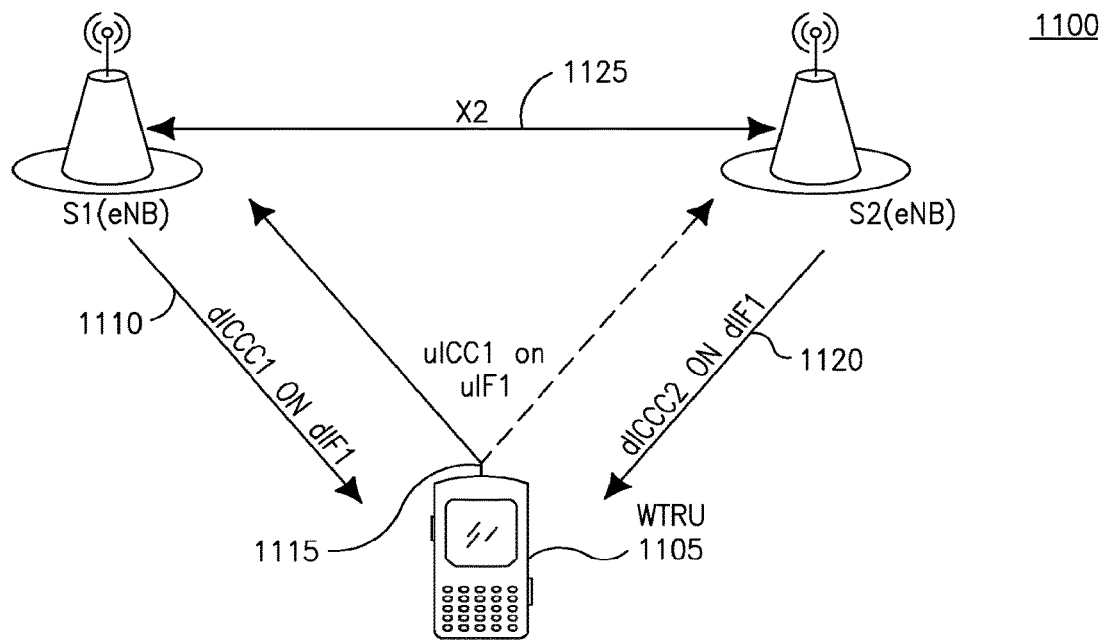

FIG. 11 shows a wireless communication system 1100 including a WTRU 1105 and two Sites (eNBs) S1 and S2. The WTRU 1105 may be connected with Site S1 via a DL 1010 (dlCCC1 on dlF1), and via a UL 1115 (ulCC1 on ulF1). The same WTRU 1105 may be connected with Site S2 via a DL 1120 (dlCCC2 on dlF1), and the UL 1115. An X2 interface 1125 may allow Sites S1 and S2 to communicate with each other. This scenario may be similar to the system 1000 of FIG. 10 in terms of UL configuration, and similar to the system 700 of FIG. 7 in terms of DL configuration.

Figure 12:
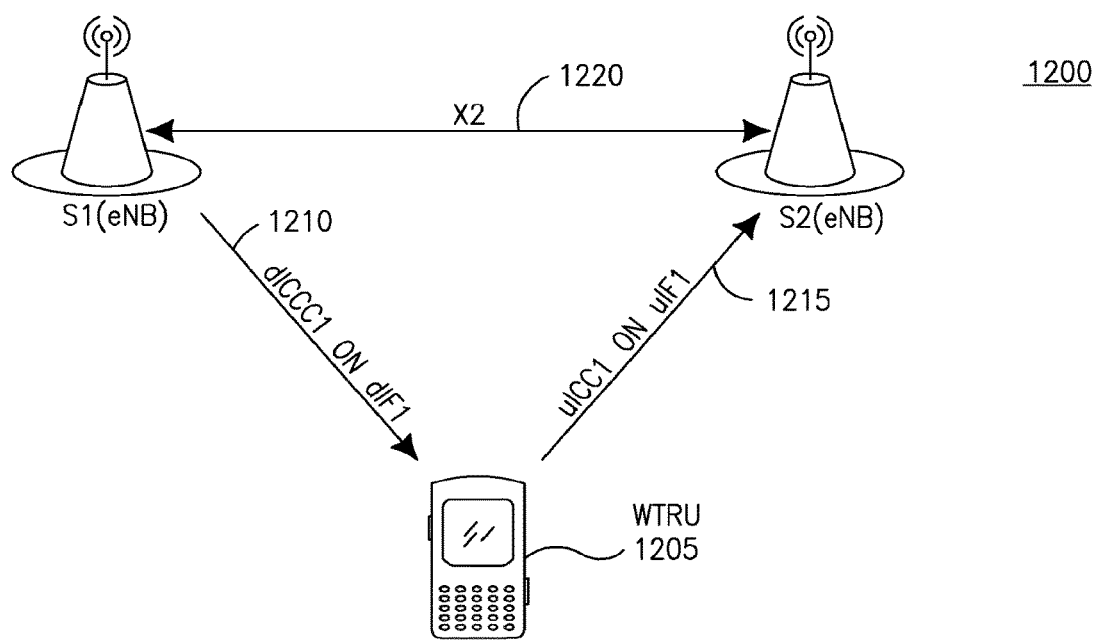

FIG. 12 shows a wireless communication system 1200 including a WTRU 1205 and two sites (eNBs) S1 and S2. The WTRU 1205 may be connected with Site S1 via a DL 1210 (dlCCC1 on dlF1) and may have no associated UL. The same WTRU 1205 may be connected with Site S2 via a UL 1215 (ulCC2 on ulF1), and may have no associated DL. An X2 interface 1220 may allow Sites S1 and S2 to communicate with each other.

All information related to feedback, CSI, power control and timing advance may be exchanged between the Sites S1 and S2 via the X2 interface 1220. In this scenario, UL power control may only be used to estimate the path loss between the Site S1 and the WTRU 1205, while the TPC bits may be generated based on the UL SINR experienced at the Site S2. The impact of this mismatch may be mitigated by applying an offset to the path loss estimated at site S1 to approximate that the path loss is at the Site S2.

In a wireless communication system, the orthogonality of OFDM-based UL transmission may be maintained when signals from different WTRUs of the same sub-frame arrive roughly in an aligned fashion at the eNB in one cell. A misalignment exceeding the cyclic fix may cause interference. The transmission of the UL radio frame number may start $(N_{TA}+N_{TA\ offset})\times T_s$ seconds before the start of the associated DL radio frame, where $0 \leq N_{TA} \leq 20512$, and $N_{TA\ offset}=0$ for frame structure type one.

The timing advance may be considered a mechanism applied to a pair of associated DL and UL carriers. A dedicated timing advance may be applied on each CC, or a common timing advance may be sufficient for all CCs.

Fuzzy cell scenarios imply further that the pair of associated DL and UL carriers used by one WTRU may be connected to two different sites. Also, one WTRU may have two UL carriers connected to two different sites. Therefore, a WTRU may need to administrate a set of timing advances, each specific to both CC and site, (two-dimensional index). One basic rule may be that a WTRU maintains separate TAs for each CC and site.

However, if two UL CCs are connected to the same site, one tracking area (TA) for both CCs may be sufficient. All of the CCs connected to the same site may share one TA command. This may reduce the RACH effort to obtain a TA during the case of HO between CCs.

The breaking of the paring of DL and UL carriers by a fuzzy cell between two different sites may cause various issues. The first issue may be that the timing advance may be determined by the eNB of one site based on the received timing measurement of UL data/control/reference signals in that particular cell. All WTRUs in a particular cell may time the transmission of the UL with a reference of the frame timing of the DL carrier in the particular cell. If a WTRU uses DL frame timing on one carrier from one site, yet applying a timing advance command received from another site, the WTRU DL and UL frame timing may not align in terms of HARQ timing.

For example, a WTRU may use CCC1-DL for DL data (PDSCH) and DL, (i.e., the associated UL CC1-UL is not active), from Site S1, and CCC2-DL for DL control (PDCCH) and the associated UL, CC2-UL, from Site S2. The reference DL frame timing of CC1-DL may be t1 and the reference DL frame timing of CC2-DL may be t2. Since the data originates from CC1-DL, the HARQ timing of this specific WTRU may be timed against t1. Meanwhile, all other WTRUs in Site 2 may time the UL transmission relative to the DL frame timing t2, and Site 2 may use all of these UL transmissions to generate a common timing advance. Applying this timing advance indirectly based on t2 on this specific WTRU whose HARQ timing is referenced against t1 may disrupt the timing relation between DL data in sub-frame N and UL ACK/NACK in sub-frame N+4. The timing advance command may indicate the change of the UL timing relative to the current UL timing as multiples of $16 \times T_s$. If the difference between t1 and t2 is large, timing advance change may break the maximum of 0.67 ms limit, and as a result, the processing of UL ACK/NACK at this WTRU may not be completed when the associated UL transmission is due. If the WTRU has a safeguard against this anomaly and pulls the UL timing within the limit, Site S2 may find the WTRU UL misaligned with other WTRUs.

Furthermore, the separation of an associated pair of DL and UL carrier to different sites may be involved with the HARQ timing, even without a timing advance impact. If both sites are synchronized, (i.e., t1 and t2 are close to each other), this issue may be alleviated. However, since the UL ACK/NACK may be forwarded from Site S2 via the X2 interface to Site S1, the resulting delay may be considered. Since an X2 interface may be realized as a TCP/IP network, the delay may be so large that it cannot be compensated for. One solution may be to deploy an RF amplify-and-forward link between sites to forward a UL ACK/NACK timely. The ACK/NACK may be forwarded directly from Site S2 to Site S1 for processing via a radio link that may be in a different frequency band. Such a radio link may facilitate other timing-sensitive signal transfer between sites in fuzzy cell scenarios as well.

An alternative approach for the scenario above is for Site S1 to directly listen to CC2-UL at the same time as site S2 directly listens to CC2-UL. The corresponding solution for a TA may be an ACK/NACK multiplexing in one UL CC corresponding to multiple DL CCs from different sites. Since each DL CC may have a UL ACK/NACK transmitted back to the same site, HARQ timing may not be an issue. Given that timing advance is on a per site basis in this case, it may be difficult to reconcile both timing advances on one UL carrier unless both CCs from these two sites are synchronized. With synchronization available, a timing advance commands from two sites may be evaluated and applied according to the smallest TA amongst all TAs received from multiple sites intended for one UL CC may be applied on this UL CC. No excessive advancement in the UL timing may occur concerning the DL CC from the site where other TAs originate from. A timing misalignment may be caused by the timing difference between two sites, but given that the two sites are synchronized, this misalignment may not be significant.

Some system level simulation results for the fuzzy cell concept have been provided herein. Specifically, an attempt has been made to find a satisfactory base station (BS) transmission scheme with a proper power profile, (and antenna pattern), for each CC, so that the cell-edge user performance may be improved by employing fuzzy cell idea.

To reduce the number of parameters for optimization, only transmission power levels may be adjusted. It is assumed that the base stations are divided into multiple clusters of the same shape with each of which consists of N cells. For example, if there are F CCs available, a power profile may be found for these F CCs in a cluster, and the same power profile may be reused for all of the other clusters. For one cluster, there may be a set of K test locations which may bee uniformly distributed. For the kth location, the carrier to interference ratio (C/I) for CC f, assuming that the WTRU is connected to a particular base station (BS), may be calculated as a function of the path loss and the power profile $\{p(n, f)\}$, where $n=1, \ldots, N$ and $f=1, \ldots, F$. According to the fuzzy cell concept, for the $f^{th}$ CC, a WTRU may be connected to the BS with the maximum C/I, which may be denoted by SIR(k, f). For a given power profile, the $\{SIR(k,f)\}$ with $k=1, \ldots, K$, and $f=1, \ldots, F$ may be determined, from which different cost functions may be defined.

One cost function for the kth location may be $C(k)=-\max\{sir(n,f)\}$ over f, and the following problem may be solved as follows:

$$\{p\_opt(n,f)\}=\arg \min \max\_k\ C(k), \text{ s.t., power constraints} \quad \text{Equation (4)}$$

This may be equivalent to maximize the worst location's best C/I ratio. For the power constraints, the total power constraint $\text{sum}\_\{n,f\}\ p(n,f)=P\_total=N \times F \times p\_eq$ may be considered, where p_eq is the transmission power from each base station for each CC, assuming a uniform power profile over space and frequency. This constraint may be for fair comparison purposes based on the performance of a non-fuzzy cell scenario, (i.e., the uniform power allocation case). Also, for each power p(n,f), there may be a lower bound P_lb, and an upper bound P_ub, by assuming that each CC has its own power amplifier at the BS. A different set of power constraints may be considered.

To only consider the worst location's performance may not be sufficient, since cell-edge user performance is typically characterized by a 5%-tile throughput in cumulative distribution function (CDF). Also, a WTRU may require more than one CC, with CC1 connecting to Site A and CC2 connecting to Site B as specified in the previous fuzzy cell solution. Thus, the rate additive white Gaussian noise (AWGN) may be:

$$r(k,f)=W(f) \times \log_2(1+\text{SIR}(k,f)), \quad \text{Equation (5)}$$

where W(f) is the bandwidth for CC f. Then, assuming that a WTRU will use V best CCs, the sum rate at kth location may be set to $R(k)=\text{sum}\_v\ r(k, v)$, with $v=1, \ldots, V$, where r(k, v) is the v-th best C/I among the F CCs. For each power profile, C/I may be calculated for each location, and CCs, from which the sum rate R(k) may be obtained and then the corresponding transmit power (TP) CDF is obtained. From CDF, the 5%-tile value may denoted by R5, which is a function of $\{p(n,f)\}$, and the cost function may be chosen to be $C=-R5(\{p(n,f)\})$ and the following problem may be solved:

$$\{p\_opt(n,f)\}=\arg \min -R5, \text{ s.t., power constraints.} \quad \text{Equation (6)}$$

A power profile that may improve a user's cell-edge performance may cause performance degradation for non cell-edge users. Besides power constraints, other constraints may be added as well to ensure that the non-cell-edge user's performance loss may be within a certain range. For each TP CDF, R50, R80 and R90 may be denoted as being the 50%-tile, 80%-tile and 90%-tile TP values, respectively. Furthermore, R50_eq, R80_eq and R90_eq may be the corresponding TP values with an equal power setting: $\{p(n, f)=p\_eq\}$. The following rate constraints may be set: $R50 \geq (1-a) \times R50\_eq$; $R80 \geq (1-a) \times R80\_eq$ and $R90 \geq (1-a) \times R9-eq$, where "a" denotes the TP loss in percentage that may be tolerated. Then, the problem in Equation (6) may become:

$$\{p\_opt(n,f)\}=\arg \min -R5, \text{ s.t., power and rate constraints.} \quad \text{Equation (7)}$$

In Equations (6) and (7), the cost function may rely on Equation (5), which assumes that the bandwidth is fixed for each CC, and the system load is irrelevant, (i.e, the number of users that connect to the same BS using the same CC), which may not reflect the entire scenario, since with non-uniform power allocation, the BSs with different powers on a particular CC may have a different coverage area, and thus, the particular CC may have a different number of users. As a consequence, the bandwidth available for each user may also change when compared to the equal power case. Taking this factor into account, for simplicity, a normalized rate may be defined as:

$$r\_norm(k,f)=W(f)/S(k,f) \times \log_2(1+\text{sir}(k,f)), \quad \text{Equation (8)}$$

where S(k,f) is the total number of locations that will connect to the same BS as the one that the kth WTRU connects to using CC f. With r_norm, Equation (7) may become:

$$\{p\_opt(n,f)\}=\arg \min -R5 \text{ norm, s.t., power and rate constraints,} \quad \text{Equation (9)}$$

with R5 norm being the 5%-tile TP using the normalized rate r_norm. Similarly the rate constraints may also be changed accordingly.

The above optimization problems may be non-linear and non-convex. As a result, MATLAB's genetic algorithm (GA) toolbox may be relied on to determine the local optimum. Some numerical results may be provided with the assumption that there are three sectors, (with 120 degree directed antennas), per site, and each cluster contains one site (3 cells).

Figure 13:
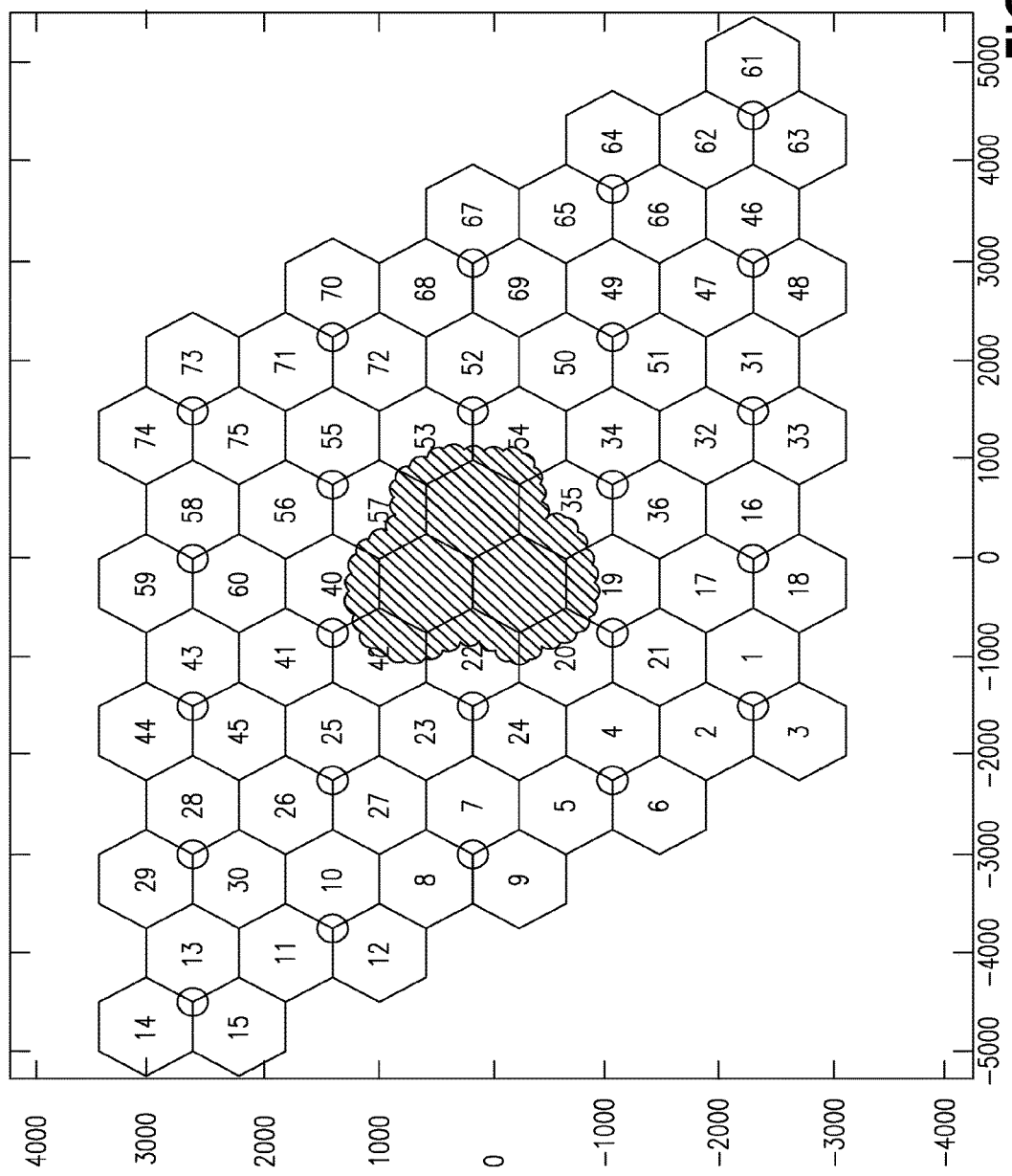
FIG. 13 shows a geometrical layout of base stations.

FIG. 13 shows a geometrical layout of base stations, whereby a cluster in the center denotes the K=3000 locations that may be used for calculating CDFs, and small circles at the intersection of three cells denote BS towers. Three CCs may be available at each cell, and since there may be three cells in a cluster, there may be a total of nine (9) power parameters (three per CC) that may be adjusted. To further reduce parameter dimensions, another constraint may be imposed on the nine parameters with the assumption that the power profile of the CCs are being reused by shifting. For example, if the power profile for CC1 is [p1, p2, p3], then for CC2, there may be [p2, p3, p1] and, for CC3, there may be [p3, p1, p2]. This additional constraint may not compulsory, but it may help the GA algorithm to converge faster to a satisfactory local optimum solution. For the following examples, p_eq=46 dBm and it may be assumed that there is no shadowing.

A first result comes with Equation (4) by assuming that p_lb=16 dBm and p_ub=55 dBm. The optimized power profile may be [50.768, 16, 16] in dBm with a worst location's best C/I being 4.673 dB, compared to the equal power case's 1.56 dB. More than 3 dB's gain may be obtained by employing non-uniform power distribution. Solving Equations (6) and (7) with the assumption of V=3, (i.e., a WTRU may use all the three CCs), basically provides the same set of power profiles, and the BS may attempt to mimic a frequency reuse factor of three case.

Figure 14:
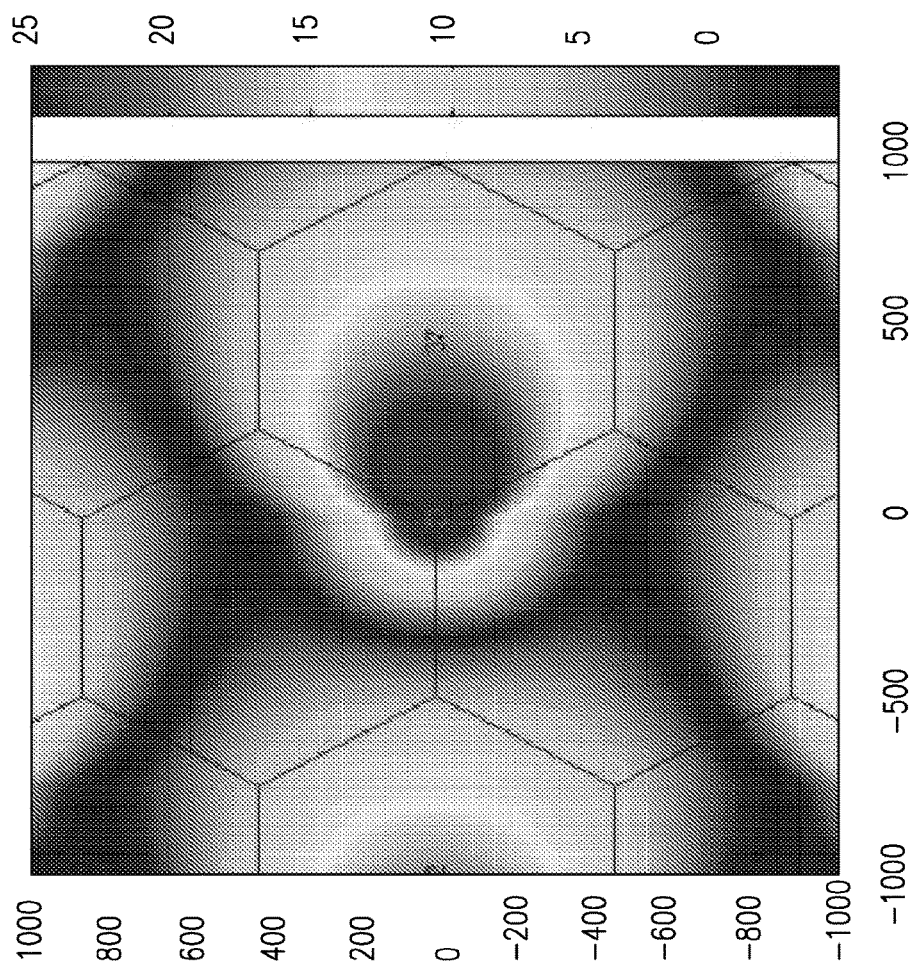
FIG. 14 shows an optimized carrier-to-interference ratio (C/I) map for a CC with a power profile.

FIG. 14 shows an optimized carrier-to-interference ratio (C/I) map for CC1 with a power profile [50.76, 16, 16] in dBm. As shown in FIG. 14, each different CC may try to cover a different area by boosting power in one sector and minimizing power in the other two sectors.

Figure 15:
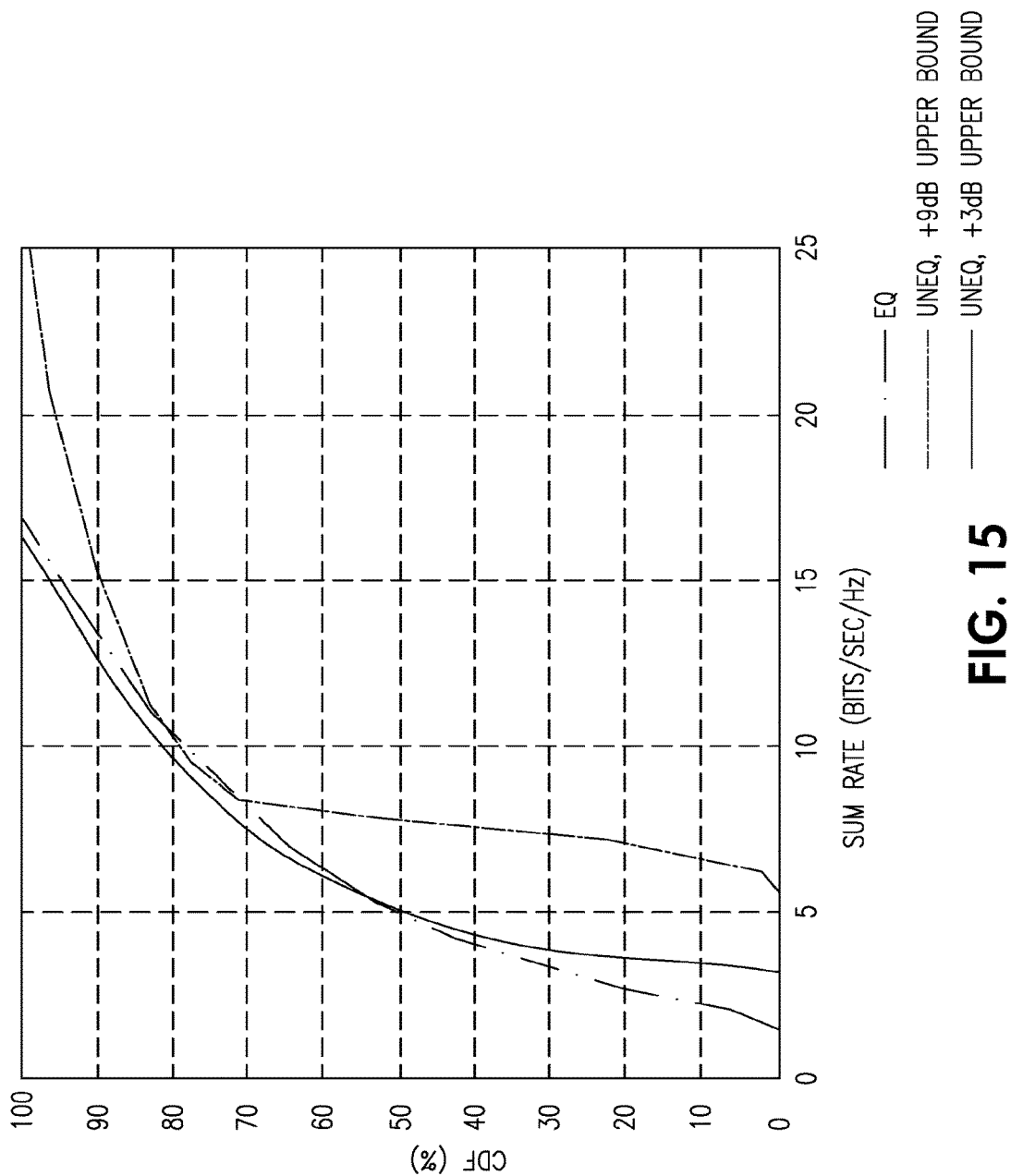
FIG. 15 is a graphical representation of a cumulative distribution function (CDF) of a non-normalized sum rate with equal power and unequal power.

FIG. 15 is a graphical representation of a CDF of a non-normalized sum rate for Equation (7), assuming W(f)=1, with equal power and un-equal power. FIG. 15 shows that the cell-edge user performance may be significantly improved with un-equal power allocation when compared to the equal power case. Also plotted are the results with a reduced upper bound (P_ub=P_eq+3 dB), which shows that the per CC power amplifier's power limit may have a significant impact to the performance gain for this example.

Figure 16:
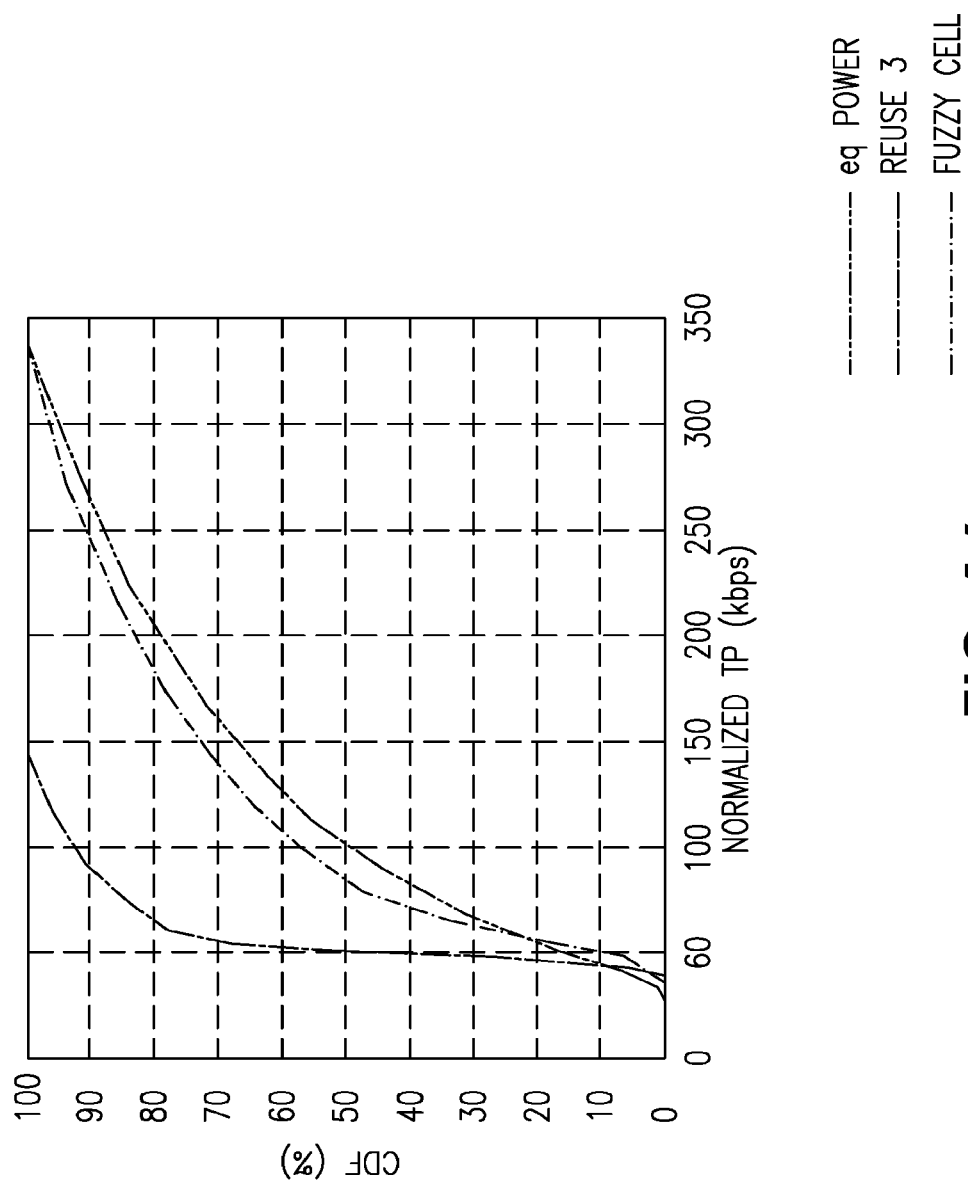
FIG. 16 is a graphical representation of a CDF of a normalized sum rate assuming each WTRU uses 3 CCs.

FIG. 16 is a graphical representation of a CDF of a normalized sum rate assuming each WTRU uses 3 CCs. FIG. 16 shows the results with Equation (9) by using a normalized TP as a metric, and W(f)=20 MHz. The "reuse 3" curve may denote the normalized TP CDF with the power profile optimized with Equation (7), where a non-normalized TP may be used in calculating cost. In this scenario, intuitively, significantly boosting one cell's power may lead to a larger coverage, and hence may have more users to share the limited bandwidth, a situation that may significantly degrade the non-cell-edge user performance, as depicted in the "fuzzy cell" line of FIG. 16, where the normalized TP CDF is presented with the power profile optimized using Equation (7) with a non-normalized TP.

Using Equation (9), the power profile [38, 47, 48] dBm may be obtained, whose CDF is also depicted in FIG. 16. FIG. 16 shows that by considering normalized sum rate, the solution of Equation (9) may provide approximately 15% cell-edge user performance improvement when compared to the equal power case. At the same time, the non-cell-edge user's performance loss may be kept under control.

Theoretically, Equation (9) may be used to handle any type of scheduler, instead of the simple equal bandwidth sharing, as long as the CDF may be obtained with a given power profile. Also, the above framework may also be extended to the case by also allowing an antenna pattern to change.

The cellular system may be inherently susceptible to error due to the nature of an underlying unsecured physical medium over the air. The support for user mobility in the cellular system may further increase the number of possible error scenarios.

In accordance with another embodiment, error handling may be performed in a CC cooperation network. A concept for enabling retention of working data flow for CA using a multi-site (eNB) when there is a communication error with a primary communication site (eNB) is described herein. Various CC cooperation network-related RAN procedures that handle individual CC failure while a CC cooperation network including multiple sites is in use will also be described.

A RLF is a procedure to restore a WTRU from an unrecoverable physical communication error condition to regain system access. Radio link quality may be measured as a hypothetical PDCCH error rate, considering PCFICH errors with an assumed transmission configuration. The WTRU may monitor a subcarrier reference signal for DL radio quality against quality thresholds Qin and Qout every frame or during a DRX active time, if a DRX configuration is applied. The physical layer may then provide in-sync and out-sync indications to the RRC entity when the quality thresholds are exceeded. RLF may be declared by a WTRU RRC upon reception of consecutive out-of sync indications, and may not receive consecutive in-sync indications for a subsequent duration. The WTRU may suspend current data traffic flow and then perform cell reselection. Upon a successful cell reselection, the WTRU may initiate an RRC connection reestablishment procedure to resume the data traffic transfer if access stratum (AS) security is activated. If the AS security is not activated, the WTRU may perform RRC connection release, (release all resources associated with established RB), and then the WTRU may enter an RRC_IDLE mode.

In CA, a WTRU may be configured to receive on multiple CCs. CA may support deployments where the cells on the different CCs may have different coverage areas, while still originating from the same eNB. Therefore, PDCCH reception on a subset of the DL component configured for PDCCH reception may fail, while other CCs may still have an operational PDCCH reception. This may expand the possible failure scenarios to one or more CCs, and all CCs failing. An RLF procedure may be declared only for the scenario where all CCs fail. In the case of a partial CC failure, (i.e., a partial RLF), the eNB may consider explicit signaling or implicit eNB detection to remove failed CC links without using an RRC connection reestablishment procedure. In the case of a partial RLF, only traffic channel associated with the affected carrier may be reset/redirected while the other carriers may continue to operate "as is".

The serving eNB may assign a UL radio resource to a WTRU with an active connection via a PDCCH in the form of either a semi-persistent-schedule (SPS), (i.e., an RRC connection message configuration), or the WTRU may have to request the eNB for a UL resource via a PUCCH channel. Implicit RLF on the WTRU side may apply to the detection of a loss of a UL communication by a layer 2 (L2)/layer 3(L3) protocol. Depending on the method used to perform a UL radio resource assignment, a different mechanism may be implemented for detection.

In the case of a UL assignment via a PUCCH request or RACH, when a PUCCH channel fails, (i.e., the maximum number of scheduling request retries has been reached), the MAC may revert to initiate a RACH procedure and, if a RACH procedure also fails, then the RRC may be informed to initiate an RRC connection reestablishment procedure, (RLF reporting).

In the case of an SPS-configuration assignment, the WTRU may monitor HARQ ACK/NACK provided by the eNB on a PDCCH after receiving the transmission. If the eNB stops receiving UL data on an assigned SPS channel for up to eight (8) transmissions, the eNB may interpret the situation as an implicit WTRU release, and reconfigure (release) the resource. If a DL PDCCH is lost as well in this situation, no further RRC configuration, UL grant or UL ACK/NACK may be possible, which may lead to an HARQ failure, causing a UL radio link control (RLC) transmission failure, (since the release of a failed SPS-configured channel may not have been received by the WTRU for deactivation). Once the maximum number of RLC retransmissions has been reached, the WTRU RRC may be informed to initiate an RRC connection reestablishment procedure (RLF reporting).

As illustrated in the two examples above, implicit radio link failure detection on the WTRU is covered under an L2/L3 protocol by the WTRU MAC and RLC mechanisms. The MAC mechanism may be based on RACH transmission failures. The WTRU may be granted a maximum number of random access (RA) retries (preambleTransMax) from SIB2 of the active CC, or in the case of handover, may be included in the mobility control information IE of an RRCConnectionReconfiguration message. Alternatively, the RRC may be informed by the MAC when the maximum RA retries has been reached, or the MAC may signal the RRC when the maximum RA retries has been reached due to the introduction of CA, (i.e., signal when a CC is attempted or all available CCs are attempted).

The RLC mechanism may only be applicable to an acknowledge mode (AM) channel based on an RLC transmission failure. The WTRU may be provided with a maximum number of retries (maxRetxThreshold) as part of a radio resource configuration in the RRC connection setup/reconfiguration/reestablishment message. The WTRU RRC may be informed by the RLC when a signaling radio bearer (SRB) or a data radio bearer (DRB) may has exceeded a maximum transmission threshold.

The RLF procedure may cause the temporarily suspension of the data traffic, or in a worst case scenario, dropping a call. This behavior is not desirable for a WTRU using CA, for which normal data traffic on another CC may be unaffected by the RLF on a serving CC.

Figure 17:
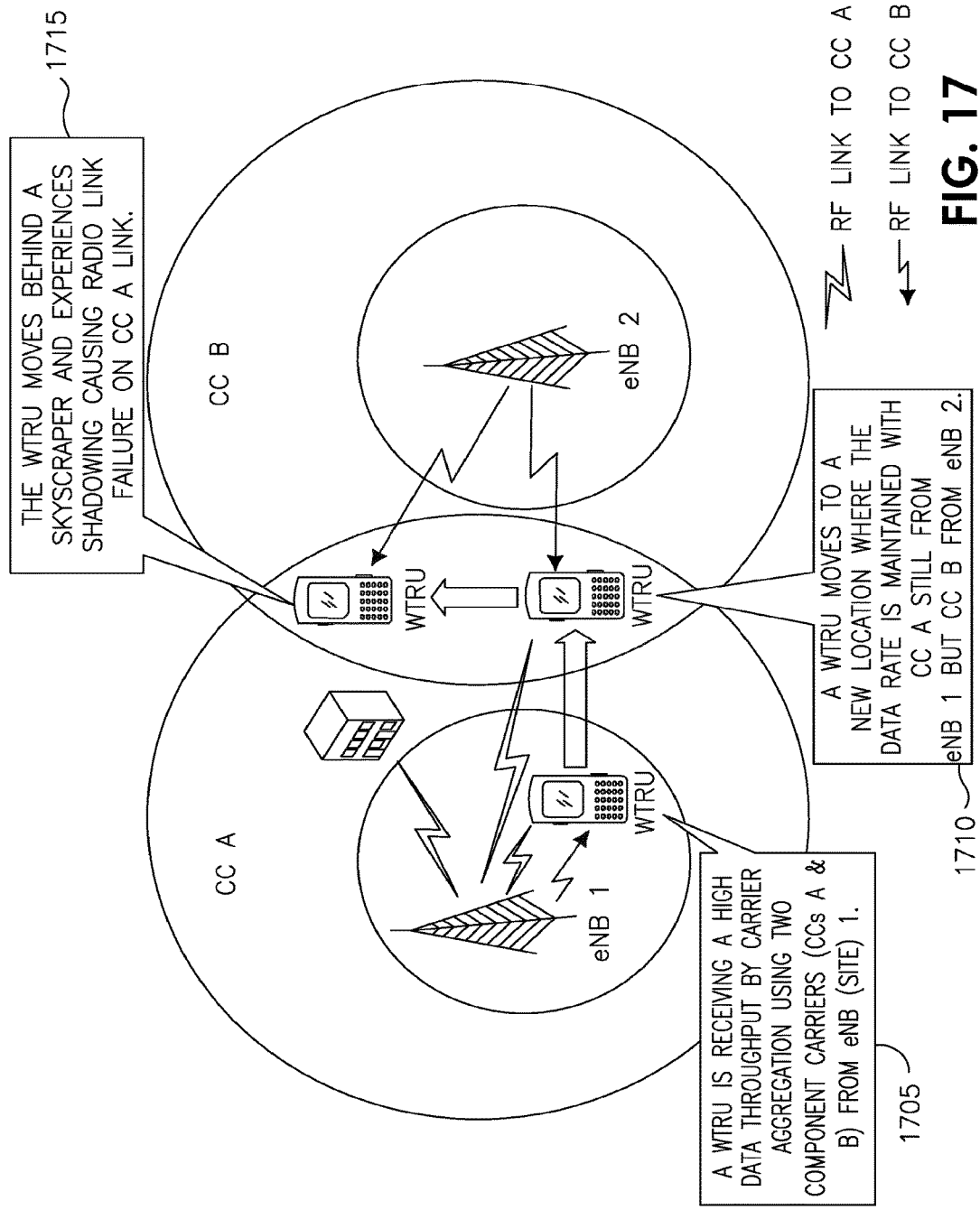
FIG. 17 shows an example radio link failure due to mobility in a cooperative component carrier (CCC)

FIG. 17 shows an example radio link failure due to mobility in a CC cooperation network. It is desirable for a WTRU to signal an RLF condition to a network having two eNBs (eNB 1 and eNB 2) using a CC on different sites. As shown in FIG. 17, the WTRU may initially be configured to receive a high data throughput (1705) using CA from 2 CCs (CC A and CC B), both from eNB 1. A dedicated control channel (DCCH) may be established on CC A, which is a special cell. As the WTRU moves away from eNB 1 towards eNB 2, the WTRU may leave the eNB 1 coverage of CC B (1710). A partial handover may reconnect the WTRU receive path on CC B to eNB 2 to regain the desired data throughput. The DCCH may remain on CC A. The WTRU may then move behind a skyscraper that creates shadowing leading to an RLF on the CC A link (1715). While the WTRU may continue to receive a satisfactory data stream on CC B from eNB 2, both the DCCH and the data path on CC A may be lost. The RLF procedure may trigger a reestablishment of an RRC connection, thus interrupting data transfer on both CCs. However, as shown by FIG. 17, the reporting of partial RLF detected by the WTRU may be caused by a loss of synchronization to the eNB 1, or by some other means that stops communication with eNB 1, may still be sent to the eNB 2 on CC B. The partial RLF reporting without a special cell may use a different eNB processing procedure, depending on the RRC connection configuration at the time of detection.

In one configuration, CC B may be the "special cell" and CC A may be part of the CC cooperation network. This is the scenario where an RRC connection handover, (during step 1710 or before the WTRU enters a shadowing position in step 1715), may cause an EPS bearer to be forwarded to the eNB 2. The WTRU context and signaling may be handled in the eNB 2. Therefore, the signaling of a partial RLF (CC B failure) notification to a special cell (on eNB 2), as well as recovery processing, (e.g., CC B release or reroute), may be performed.

In another configuration, CC A may be the "special cell" and CC B may be part of the CC cooperation network. In this scenario, only CC B may be reconfigured onto eNB 2 during step 1710. The responsibility to make decisions/commands to control the WTRU's behavior may remain with eNB 1. The signaling of a partial RLF notification when received on eNB 2 may need to be forwarded to the eNB 1 for further WTRU configuration. If this reporting is not delivered to the eNB 1, or forwarded after the eNB1 implicitly detects RLF, the eNB 1 may drop the active call if communication via CC A may not be restored.

In accordance with one embodiment, a WTRU notification of RLF on individual active CC(s) in the CC cooperation network to the serving eNB is described. In this embodiment, the WTRU may explicitly signal a partial RLF to an eNB in a multiple-site CA configuration.

When an anchor CC on a non-serving eNB fails, the WTRU may use a PDCCH or PUSCH associated with the serving eNB to explicitly signal a partial RLF condition to the serving eNB.

When an anchor CC on a serving eNB fails, the WTRU may explicitly signal a partial RLF condition on another available CC. The reporting of a partial RLF to the eNB 1 may be beneficial in comparison to an implicit eNB 1 RLF detection, since this may enable the mechanism that may allow eNB 1 to initiate a seamless handover and use X2 data tunneling to minimize data packet losses during the transition.

The direct notification of a partial RLF may be signaled over an X2 interface by a cooperating eNB to a serving eNB. However, in the case where the cooperating eNB is not able to communicate over an X2 interface, communication over an S1-mobility management entity (MME) interface may be implemented.

Figure 18:
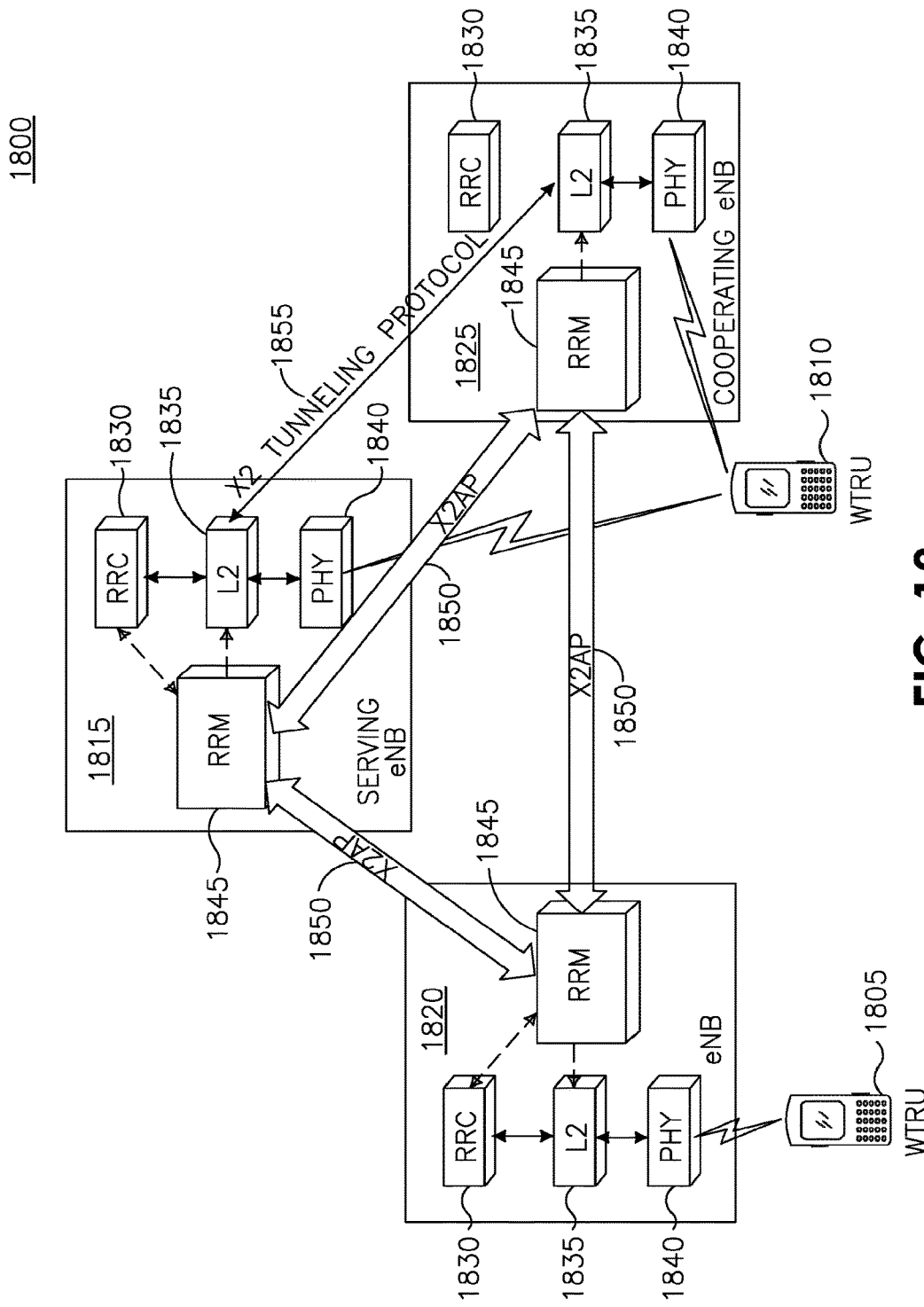
FIG. 18 shows an example eNB access stratum protocol architecture.

FIG. 18 shows an eNB access stratum (AS) protocol architecture 1800 including two WTRUs 1805 and 1810, and three eNBs 1815, 1820 and 1825. Each of the eNBs 1815, 1820 and 1825 may include an RRC 1830, an L2 entity 1835, a physical (PHY) layer entity 1840 and a radio resource management (RRM) unit 1845 for CC centric resource management. This architecture may maintain a one-to-one peer RRC entity relationship, and may ensure that there is only one terminating point for RRC signaling. The RRM units 1845 may communicate with each other via inter-node X2 application protocol (X2AP) interfaces 1850. An X2 interface user plane protocol based on GPRS tunneling protocol 1855 may be used for in-band data traffic signaling between the L2 entities 1835 in eNBs 1815 and 1825.

The RRM unit 1845 may be the functional entity on the eNB that may be responsible for managing the access stratum (AS) radio resources. There may be one master RRM 1845 on each of the eNBs 1815, 1820 and 1825 that may be responsible for allocation of eNB specific backhaul or air interface resources. The individual CC(s) on the eNBs 1815, 1820 and 1825 may be managed as part of a master RRM unit, (that may be taking input from sub-modules that monitor dedicated CCs).

The RRC 1830 may be the functional entity responsible for tracking, (request and return), resources assigned to a dedicated WTRU, as well as processing signaling protocols responsible for signaling AS assignment to a single WTRU. The RRC 1830 may negotiate with the RRM unit 1845 to obtain required resources to provide user service(s) at requested quality of service (QoS). There may only be one RRC per WTRU in a connected state at any time when a WTRU is active. In the scenario where multiple sites are utilized as part of a CC cooperation network, there may be a dedicated "serving eNB" where an RRC resides.

The inter-eNB X2AP interfaces 1850 may be the signaling interfaces for the eNBs 1815, 1820 and 1825 in a cooperative active set.

The eNB access stratum (AS) protocol architecture 1800 of FIG. 18 may include two WTRUs 1805 and 1810 with an active connection to receive connection service from three eNBs 1815, 1820 and 1825. The WTRU 1805 may communicate with only eNB 1820. The WTRU 1810 may communicate with the eNB 1815 (the serving eNB) and the eNB 1825 (the cooperating eNB) using an RRC connection, where a RRC connection may be established or reconfigured at the eNB 1815 to include a CCC for data-splitting. The eNB 1815 may exchange system information configuration and radio environment information with the neighbor eNBs 1820 and 1825, which together may form the candidate "cooperative active set" for the WTRU (1805, 1810). The eNB 1815 may maintain the RRC context for the WTRU 1810 to facilitate mobility management and data routing. The eNB 1825 may maintain a partial RRC context to facilitate data-forwarding and control signaling for this WTRU 1810. The WTRU 1810 may perform measurements on the eNB 1820 as a candidate to join cooperative transmission. The eNB 1820 may not maintain the WTRU 1810 RRC until cooperative transmission from the eNB 1820 may be activated by the serving eNB 1815.

In the scenario where a WTRU may detect a CC failure, a partial RLF report may be sent to a CC of a cooperating eNB 1825 by the WTRU 1810. The following embodiments are alternative WTRU reporting mechanisms, which may be categorized and described below in terms of "RRC based" or "non-RRC based" reporting.

If an RRC message is signaled, a UL path associated with an SRB, (or a DCCH logical channel), may exist on the cooperating eNB. This may or may not be the case with the cooperating eNB 1825. For example, a WTRU using a cooperating CC, for DL data transfer only, may not be required to setup a UL transport channel. The types of RLF detections that may be reported based on this method are WTRU explicit/implicit RLF detections.

For "non-RRC-based partial RLF reporting," if a non-RRC-based signaling method is employed, modification to an existing X2 interface may be required for the cooperating eNB 1825 to provide this indication to the serving eNB 1815. The types of RLF detections that may be reported based on this method are based on WTRU implicit UL RLF detection by a MAC using a MAC control element (CE), or modifying a physical control channel header, (such as a PUCCH header), for information insertion as well as eNB RLF detections. On successful reception of the partial RLF indication, the cooperating eNB 1825 may forward a partial RLF report to the serving eNB 1815 for resource reassignment.

One alternative eNB forwarding solution corresponding to various possible WTRU reporting mechanisms may include the use of an on-demand inter-eNB signaling configuration by establishing an X2 interface, or a common control channel (CCCH) or a dedicated control channel (DCCH), after reception of an RLF indication by the cooperating eNB 1825. Since only a CC with active data path is used to signal an RLF, the cooperating eNB 1825 may be aware of the WTRU context, and therefore may identify the location of the serving eNB 1815 to be forwarded to. A new X2 message may be created to forward an RLF signal as an encapsulated data or explicit indication. Alternatively, an X2 data plane interface may be modified to allow a special configuration in the tunneling protocol frame header to indicate that a CCCH/DCCH message for the WTRU 1810 is sent.

Another alternative eNB forwarding solution corresponding to various possible WTRU reporting mechanisms may include using a preconfigured CCCH/DCCH path to all cooperating eNBs and configure a transport channel associated with a DRB as well as an SRB on the cooperating eNB 1825.

Inter-eNB communication may generally described in terms of the following two types: an X2AP message defined that may be used for communicating eNB/BS system relevant information, and an X2 data transport that may be used for in-band data traffic signaling. Depending on the reporting method, (RRC or non-RRC), that the cooperating eNB 1825 may receive the partial RLF reporting from the WTRU, one or both types of communications are possible, (with modification), to provide the following routing procedures.

Configuring a CCCH/DCCH logical channel over an X2 interface on demand may be possible. However, this may require an X2AP exchange between two relevant eNBs to establish a new tunneling path. This may incur a delay which may render less desirable the establishment of a dynamic logical channel.

Alternatively, explicit signaling over an X2 interface may be performed, since the coordinating eNB 1825 may be aware of the WTRU context, (setup on data-split), and the associated serving eNB 1815. Two possible approaches may include the creation of a new X2AP message to provide specific WTRU information. In one approach, this new WTRU-specific X2AP message may be used to forward the RRC message, (received on a DCCH or a CCCH), to the serving eNB 1815 for delivery to its RRC 1830 for further processing. In another approach, the X2 tunneling protocol data header may be modified to provide explicit in-band signaling over an X2 interface, since the cooperating eNB 1825 is already processing WTRU-specific data traffic on the X2 tunnel. There is some overhead expected on the X2 tunnel, since multiple DRBs are bundled on this tunnel. Therefore, the X2 tunnel overhead may be modified by adding a parameter bit field to distinguish if the pay load is DRB or SRB, (it not necessary to distinguish between SRB 0, 1, or 2 as the RRC 1830 may be able to decode this information as part of abstract syntax notation one (ASN.1) decoding).

In an alternate embodiment, the X2 tunnel overhead may be modified by adding a bit field to identify the forwarding destination channel ID (depending on the data-split mode: packet data convergence protocol (PDCP)-split (RB ID), RLC-split (logical channel ID), and MAC-split (transport channel ID). In this approach, there may be no new field added to what may be already needed by the data traffic routing processing.

In another alternate embodiment, notification of a RLF failure may be performed by adding a new MAC control element. The MAC CE reporting along with other implicit DL RLF detection performed on the eNB may be detected by the cooperating eNB 1825, depending on the method used to split the data.

When a packet data convergence protocol (PDCP)/RLC level split is performed, implicit detection (RLC or PHY sync failure) as well as MAC CE reporting may be terminated on the cooperating eNB 1825. However, the RLF indication may be forwarded to the RRC 1830 on the serving eNB 1815.

In one embodiment, a new X2AP message may be created for providing specific WTRU status. The information provided in the new X2AP message may include the radio link that failed and how the decision may have been obtained, (i.e., implicit detection (DL RLC unrecoverable error, or PHY sync failure), or MAC CE indication of partial RLF reporting from the WTRU). A special frame format may be added to the X2 tunneling protocol to provide the information provided in the new X2AP message.

In another embodiment, a MAC level split may be performed, whereby an implicit detection (PHY sync failure) and MAC CE reporting may be terminated on the cooperating eNB 1825. A solution similar to the PDCP/RLC level split may apply, except that the implicit RLC detection may occur on the serving eNB 1815, and therefore may not be needed in the possible data field.

For the RLF signaling enhancement, an additional configuration for an SRB from the serving eNB 1815 to the cooperating eNB 1825 during RRC connection reconfiguration may be implemented, (when a data-split path is configured). An active RRC connection may be security activated, and all RRC messages may be integrity protected and ciphered by a PDCP. Therefore, regardless of the proposed data-split model, (PDCP, RLC, or MAC), a logical control (CCCH/DCCH) channel establishment over an X2 interface that may be bundled with the data traffic may be sufficient to provide the necessary routing path for the cooperating eNB 1825 to forward the RRC message, (explicit partial RLF indication), to the serving eNB 1815.

One assumption for reporting an RLF to the serving eNB 1815 over the X2 interface 1850 may be that this mechanism may trigger the serving eNB 1815 to initiate an RLF recovery before an implicit detection of the RLF leads to a dropped call, given that the RLF over the CC A interface may signify that communication with eNB 1 may be completely lost. Therefore, the only likely handling for serving eNB1 is to perform a handover to eNB 2 may be if the WTRU remains stationary in the RF shadow region. However, when an X2 interface is not available, (e.g., the HeNB may not support an X2 interface), the S1-MME interface may be an alternative interface that may be modified to support this reporting.

In another embodiment, an S1-MME interface (not shown) may be modified to support a procedure that enables the cooperating eNB 1825 to report RLF, and a procedure for an MME to initiate handover. These two procedures may be combined and streamlined into one "target cell requested handover" procedure initiated over an S1-MME interface by the cooperating eNB 1825. This mechanism may use the RRM 1845 on the cooperating eNB 1825 to access to sufficient WTRU data routing context and over-the-air (OTA) resource utilization to make an intelligent decision that handover may be the most logical recovery procedure as the result of a partial RLF. RRC communication with the S1-MME may be initiated from the cooperating eNB 1825, (on-demand or preconfigured). Some intelligence may be built into the system architecture 1800 or signaling protocol to ensure that only one "targeted cell requested handover" procedure initiated by the cooperating eNB 1825 may exist for a WTRU at a given time.

Although features and elements are described above in particular combinations, one of ordinary skill in the art will appreciate that each feature or element may be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, WTRU, terminal, base station, RNC, or any host computer.

What is claimed is:

1. A wireless transmit/receive unit (WTRU) comprising:
a transceiver; and
a processor,
wherein the transceiver and the processor are configured to receive a first timing advance from a first eNodeB and a second timing advance from a second eNodeB, and the WTRU is configured with a first power control configuration specific to uplink component carriers associated with the first eNodeB and a second power control configuration specific to uplink component carriers associated with the second eNodeB,
wherein the processor is further configured to control the transceiver for simultaneous transmission of a first transmission on a first physical uplink control channel (PUCCH), to the first eNodeB, using a first uplink component carrier, and a second transmission on a second PUCCH, to the second eNodeB, using a second uplink component carrier,
wherein the first transmission has a first timing adjusted by the first timing advance and not adjusted by the second timing advance and has a first power level that is based on both the first power control configuration and a maximum power level related to a class of the WTRU and not based on the second power control configuration, and
wherein the second transmission has a second timing adjusted by the second timing advance and not adjusted by the first timing advance and a second power level based on both the second power control configuration and the maximum power level related to a class of the WTRU and not based on the first power control configuration.

2. The WTRU of claim 1, wherein the processor is further configured to determine a first pathloss associated with the first eNodeB and a second pathloss associated with the second eNodeB, wherein the first power level is based on the first pathloss and the second power level is based on the second pathloss.

3. The WTRU of claim 1, wherein the processor is further configured to utilize split medium access control (MAC) and radio link control sublayers to handle communications for the first and second eNodeB.

4. The WTRU of claim 1, wherein the first eNodeB has a first plurality of uplink component carriers configured for the WTRU, wherein the first uplink component carrier is a primary component carrier and other uplink component carriers of the first plurality of uplink component carriers are secondary component carriers.

5. The WTRU of claim 4, wherein the secondary component carriers are not used for transmission on a PUCCH.

6. A method, implemented by a wireless transmit/receive unit (WTRU), the method comprising:
   receiving, by the WTRU, a first timing advance from a first eNodeB and a second timing advance from a second eNodeB, wherein the WTRU is configured with a first power control configuration specific to uplink component carriers associated with the first eNodeB and a second power control configuration specific to uplink component carriers associated with the second eNodeB; and
   simultaneously transmitting, by the WTRU, a first transmission on a first physical uplink control channel (PUCCH), to the first eNodeB, using a first uplink component carrier, and a second transmission on a second PUCCH, to the second eNodeB, using a second uplink component carrier,
   the first transmission having a first timing adjusted by the first timing advance and not adjusted by the second timing advance and having a first power level that is based on both the first power control configuration and a maximum power level related to a class of the WTRU and not based on the second power control configuration, and
   the second transmission having a second timing adjusted by the second timing advance and not adjusted by the first timing advance and a second power level based on both the second power control configuration and the maximum power level related to a class of the WTRU and not based on the first power control configuration.

7. The method of claim 6, further comprising determining, by the WTRU, a first pathloss associated with the first eNodeB and a second pathloss associated with the second eNodeB, wherein the first power level is based on the first pathloss and the second power level is based on the second pathloss.

8. The method of claim 6, wherein split medium access control (MAC) and radio link control sublayers are used to handle communications for the first and second eNodeB.

9. The method of claim 6, wherein the first eNodeB has a first plurality of uplink component carriers configured for the WTRU, wherein the first uplink component carrier is a primary component carrier and other uplink component carriers of the first plurality of uplink component carriers are secondary component carriers.

10. The method of claim 9, wherein the secondary component carries are not used for transmission a PUCCH.

11. The WTRU of claim 1, wherein the first power level and the second power level are further based on a priority between the first eNodeB and the second eNodeB.

12. The method of claim 6, wherein the first power level and the second power level are further based on a priority between the first eNodeB and the second eNodeB.

* * * * *